(12) United States Patent
Chen et al.

(10) Patent No.: US 12,267,106 B2
(45) Date of Patent: Apr. 1, 2025

(54) FREQUENCY DOMAIN METHOD AND SYSTEM FOR MEASURING MODAL BANDWIDTH, CHROMATIC DISPERSION, AND SKEW OF OPTICAL FIBERS

(71) Applicant: CORNING INCORPORATED, Corning, NY (US)

(72) Inventors: Xin Chen, Painted Post, NY (US); Kangmei Li, San Jose, CA (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 442 days.

(21) Appl. No.: 17/725,924

(22) Filed: Apr. 21, 2022

(65) Prior Publication Data
US 2022/0376786 A1 Nov. 24, 2022

Related U.S. Application Data

(60) Provisional application No. 63/246,448, filed on Sep. 21, 2021, provisional application No. 63/185,004, filed on May 6, 2021.

(51) Int. Cl.
*H04B 10/07* (2013.01)
*H04B 10/079* (2013.01)
(Continued)

(52) U.S. Cl.
CPC ... *H04B 10/07951* (2013.01); *H04B 10/2581* (2013.01); *H04B 10/541* (2013.01);
(Continued)

(58) Field of Classification Search
CPC .......... H04B 10/07951; H04B 10/2581; H04B 10/541; H04B 10/07; H04B 10/0775; H04B 10/25; G01M 11/333
(Continued)

(56) References Cited

U.S. PATENT DOCUMENTS 6,885,802 B2 4/2005 Oliveti et al.
7,945,159 B2 5/2011 Pape
(Continued)

OTHER PUBLICATIONS

Li et al, Modal Delay and Bandwidth Measurements of Bi-Modal Fibers, Nov. 2019, ACP, All Document. (Year: 2019).*
(Continued)

*Primary Examiner* — Dibson J Sanchez
(74) *Attorney, Agent, or Firm* — Amy T. Lang

(57) ABSTRACT

A method including transmitting an intensity-modulated light through a mode conditioner to generate a mode-conditioned intensity-modulated light in one or a plurality of launch conditions and transmitting the mode-conditioned intensity-modulated light through a multimode optical fiber under test (FUT) to excite a plurality of modes of the FUT. The method further includes converting the mode-conditioned intensity-modulated light transmitted through the FUT into an electrical signal, measuring, based on the electrical signal, a complex transfer function CTF(f) of the FUT, and obtaining an output pulse based on the measured complex transfer function CTF(f) from one or a plurality of launch conditions and an assumed input pulse using the equation: $P_{out}(t) = \mathcal{F}^{-1}(CTF(f)^* \mathcal{F}(P_{in}(t)))$. Wherein, $P_{out}(t)$ is the output pulse, $\mathcal{F}^{-1}(CTF(f)^* \mathcal{F}(P_{in}(t)))$ is the inverse Fourier transform of the function $CTF(f)^* \mathcal{F}(P_{in}(t))$, and $\mathcal{F}(P_{in}(t))$ is the Fourier transform of the assumed input pulse. Additionally, the method includes calculating modal bandwidth of the FUT based on $P_{out}(t)$.

18 Claims, 15 Drawing Sheets

(51) Int. Cl.
    *H04B 10/2581* (2013.01)
    *H04B 10/54* (2013.01)
    *H04B 10/077* (2013.01)
    *H04B 10/25* (2013.01)

(52) U.S. Cl.
    CPC .......... *H04B 10/07* (2013.01); *H04B 10/0775* (2013.01); *H04B 10/25* (2013.01)

(58) Field of Classification Search
    USPC ............................. 398/9–38, 124, 140–172
    See application file for complete search history.

(56) References Cited

U.S. PATENT DOCUMENTS

| | | | |
|---|---|---|---|
| 8,588,569 | B2 | 11/2013 | Bookbinder et al. |
| 8,666,214 | B2 | 3/2014 | Bookbinder et al. |
| 8,797,519 | B2 | 8/2014 | Chen et al. |
| 8,891,925 | B2 | 11/2014 | Bickham et al. |
| 9,377,377 | B2 | 6/2016 | Chen et al. |
| 11,012,154 | B2 | 5/2021 | Chen et al. |
| 2007/0071054 | A1* | 3/2007 | Takahashi ........... H01S 5/18311 372/50.1 |
| 2011/0054861 | A1 | 3/2011 | Lane |
| 2011/0217012 | A1* | 9/2011 | Bigot-Astruc ..... G02B 6/03666 385/127 |
| 2013/0287347 | A1* | 10/2013 | Taru ................... G02B 6/02042 385/100 |
| 2014/0092380 | A1* | 4/2014 | Chen ...................... G01M 11/31 356/73.1 |
| 2014/0226151 | A1 | 8/2014 | Bennett et al. |
| 2014/0318188 | A1 | 10/2014 | Bowker et al. |
| 2014/0319354 | A1 | 10/2014 | Chen et al. |
| 2016/0025923 | A1* | 1/2016 | Castro ................. G02B 6/0288 385/124 |
| 2016/0041332 | A1 | 2/2016 | Pimpinella et al. |
| 2016/0254861 | A1 | 9/2016 | Molin et al. |
| 2017/0176285 | A1* | 6/2017 | Molin .................. G01M 11/338 |
| 2018/0372582 | A1* | 12/2018 | Liu ........................ G02B 6/422 |
| 2019/0260470 | A1* | 8/2019 | Castro ................ H04B 10/0731 |
| 2020/0057191 | A1* | 2/2020 | Parsons ................ G01M 11/338 |
| 2020/0174183 | A1* | 6/2020 | Pimpinella ......... H04B 10/2581 |
| 2020/0257040 | A1 | 8/2020 | Chen et al. |
| 2022/0271834 | A1* | 8/2022 | Castro ................ H04B 10/0775 |

OTHER PUBLICATIONS

Chen et al, 300m transmission over multimode fiber at 25Gbs using a multimode launch, Nov. 2013, Optics Express, All Document. (Year: 2013).*

Hsuan-Yun Kao et al, "Comparison of single-/few-/multi-mode 850 nm VCSELs for optical OFDM transmission", vol. 25, No. 14 | Jul. 10, 2017 | Optics Express 16347.

* cited by examiner (a)

INPUT  OUTPUT (b)

FREQUENCY DOMAIN METHOD AND SYSTEM FOR MEASURING MODAL BANDWIDTH, CHROMATIC DISPERSION, AND SKEW OF OPTICAL FIBERS

This application claims the benefit of priority under 35 U.S.C. § 119 of U.S. Provisional Application Ser. No. 63/185,004 filed on May 6, 2021 and U.S. Provisional Application Ser. No. 63/246,448 filed on Sep. 21, 2021, the contents of which are relied upon and incorporated herein by reference in their entirety.

FIELD OF THE DISCLOSURE

The present disclosure relates to optical fibers and in particular relates to systems and methods for measuring modal bandwidth, chromatic dispersion, and skew in multimode and multicore optical fibers using a frequency domain method.

BACKGROUND OF THE DISCLOSURE

Multimode optical fibers used with short-wavelength VCSELs (vertical cavity surface emitting lasers) have emerged as a dominant technology for short-reach, high data networks. Examples of such networks include office buildings and data centers. Single mode optical fibers can achieve much greater data rates and transmission lengths than multimode optical fibers. But a short-reach, high data network using single mode optical fibers requires that the fibers are coupled with lasers, splices, and connectors, thus resulting in a more expensive network than a short-reach, high data network using multimode optical fibers coupled with VCSELs. Furthermore, the higher data rates and transmission lengths achievable with single mode fibers are not required for short-reach, high data networks. So, multimode fibers provide an effective low-cost optical connectivity solution for such short-reach, high data networks.

Multimode fibers operating at 850 nm are currently a leading optical media used in short-reach, high data networks. Such fibers typically meet an industry-standard set of requirements referred to as "OM4," which imposes minimum bandwidth requirements at 850 nm. But recent trends are driving multimode fibers to longer wavelengths. The recently ratified OM5 industry-standard requirements impose minimum bandwidth requirements at 953 nm. Due to desires for compatibility with legacy 850 nm systems and wavelength division multiplexing capability, an OM5 fiber must also meet the OM4 requirements. So, the OM5 standard includes all of the requirements of the OM4 standard, plus additional minimum bandwidth requirements at 953 nm.

The manufacturing process for optical fibers inevitably leads to variations from fiber to fiber, which can affect fiber performance. For example, a process designed to produce OM4 fibers may result in a high yield of fiber that actually meets the OM4 requirements, but there may be some fibers that do not. So, before being sold, each fiber is typically measured and verified that it meets the OM4 specifications prior to shipment. For example, a bandwidth measurement at 850 nm may determine that a fiber does not meet the OM4 requirements but that it does meet the OM3 requirements. If the measured 850 nm bandwidth verifies that a fiber meets the OM4 requirements, a second bandwidth measurement at 953 nm may be performed to determine if this fiber also meets the OM5 requirements.

Multimode fibers with an effective modal bandwidth at 850 nm of 4700 MHz-km are verified to meet the OM4 standard requirement. These fibers must have the same effective modal bandwidth at 850 nm and must also have an effective modal bandwidth at 953 nm of 2470 MHz-km to be verified to meet the OM5 standard requirement. It is also noted that there are other types of industry-standard requirements, such as OM1, OM2 and OM3, with different effective modal bandwidth requirements. The effective modal bandwidth is determined by performing an industry standard measurement referred to as a Differential Mode Delay, or "DMD" measurement, on the fiber using an 850 or 953 nm laser.

Furthermore, the skew of an optical fiber can affect the fiber's performance at each standard requirement. Skew is the difference in signal propagation time between fiber channels in synchronous parallel data channels, such as in different cores of a multicore optical fiber. Too high of a skew can prevent the multicore optical fiber from being used in communication systems that require minimal optical signal time delay between cores, such as parallel data transmission between multiple processors in data center applications. Additionally, excessive skew can cause transmission errors in the optical signal.

Related to skew is chromatic dispersion, which is another important factor in a fiber's performance. Chromatic dispersion is the spreading of an optical signal at it travels along a fiber. The effects of chromatic dispersion accumulate with distance and can limit how far a signal can be transmitted through a fiber.

SUMMARY OF THE DISCLOSURE

Embodiments of the present disclosure use a frequency domain method to measure modal bandwidth in multimode optical fibers. Additionally, embodiments of the present disclosure use a frequency domain method to measure skew and chromatic dispersion in multicore optical fibers.

The commonly used DMD measurement to measure modal bandwidth in multimode optical fibers uses a DMD bench to measure differential mode delay of the fibers in the time domain over various radial offset locations across the fiber core, and the modal bandwidth of the fibers is calculated using several assumed laser launch conditions. Such a measurement relies on using a high-power pulsed laser. However, changing between different wavelengths when, for example, measuring a fiber for the OM4 standards and then for the OM5 standards, is not straightforward with the DMD bench. Furthermore, some customers require customized fibers with specifically tailored modal bandwidths. Measuring such customized modal bandwidths using the DMD measurement can be burdensome or, in some cases, not even feasible. For example, the high-power pulsed laser of the DMD bench is limited to below 1000 nm, and therefore cannot measure wavelengths at, for example, 1060 nm.

The methods and systems of the present disclosure use frequency domain to measure modal bandwidth. The methods and systems of the present disclosure can easily change between different wavelength measurements, providing greater flexibility than with the traditional DMD measurements.

Using the frequency domain bandwidth measurement of the present disclosure, a complex transfer function is measured from a launch condition or a sequence of launch conditions that the system is already configured for. For example, similar to the conventional DMD method, in the embodiments of the present disclosure, light is launched from a single mode fiber (or equivalent setup). Furthermore, in the embodiments of the present disclosure, the complex transfer function is then measured from a sequence of controlled offsets, just like a DMD bench that is conventionally used. Therefore, the embodiments of the present disclosure accomplish the same end result as the conventional DMD measurement but use a frequency domain method. The embodiments of the present disclosure do not use the pulsed laser as in the conventional DMD bench, and instead use a continuous wave laser and an intensity modulator. Advantageously, the frequency domain method has higher sensitivity to the signals, therefore, the measurement can be done using a lower laser power performed over a longer length of the fiber and without requiring a high power laser.

The present disclosure is directed to a system for measuring the modal bandwidth and related methods for multimode optical fibers.

Furthermore, the methods and systems of the present disclosure use frequency domain to measure group delays (also referred to as time of flight or propagation time), chromatic dispersion of each mode, and skew of multicore optical fibers. Skew and chromatic dispersion are traditionally measured in the time domain by launching one optical pulse at the input of each core and observing the pulses at the output of each core. However, such traditional measurements are time consuming and require a great amount of optical power. The below-disclosed frequency domain method can be applied to multicore fibers to determine the skew and chromatic dispersion of these fibers.

Aspects of the disclosure are directed to a method comprising transmitting an intensity-modulated light through a mode conditioner to generate a mode-conditioned intensity-modulated light in one or a plurality of launch conditions and transmitting the mode-conditioned intensity-modulated light at an operating wavelength through a multimode optical fiber under test (FUT) to excite a plurality of modes of the FUT. The method further comprises converting the mode-conditioned intensity-modulated light transmitted through the FUT into an electrical signal, measuring, based on the electrical signal, a complex transfer function CTF(f) of the FUT, and obtaining an output pulse based on the measured complex transfer function CTF(f) from one or a plurality of launch conditions and an assumed input pulse using the equation: $P_{out}(t) = \mathcal{F}^{-1}(CTF(f) * \mathcal{F}(P_{in}(t)))$. Wherein, $P_{out}(t)$ is the output pulse, $\mathcal{F}^{-1}(CTF(f) * \mathcal{F}(P_{in}(t)))$ is the inverse Fourier transform of the function $CTF(f) * \mathcal{F}(P_{in}(t))$, and $\mathcal{F}(P_{in}(t))$ is the Fourier transform of the assumed input pulse. Additionally, the method comprises calculating a modal bandwidth of the FUT based on $P_{out}(t)$.

Aspects of the disclosure are also directed to a method comprising transmitting an intensity-modulated light through a mode conditioner to generate a mode-conditioned intensity-modulated light in one or a plurality of launch conditions and transmitting the mode-conditioned intensity-modulated light at an operating wavelength through a multicore optical fiber under test (FUT) to excite a plurality of modes of the FUT. The method further comprises converting the mode-conditioned intensity-modulated light transmitted through the FUT into an electrical signal, measuring, based on the electrical signal, a complex transfer function CTF(f) of the FUT, and calculating at least one of skew and chromatic dispersion of the FUT using the complex transfer function.

Aspects of the disclosure are directed to a method comprising transmitting an intensity-modulated light through a mode conditioner to generate a mode-conditioned intensity-modulated light in one or a plurality of launch conditions and transmitting the mode-conditioned intensity-modulated light at an operating wavelength through an optical fiber under test (FUT) to excite a plurality of modes of the FUT. The method further comprises converting the mode-conditioned intensity-modulated light transmitted through the FUT into an electrical signal, measuring, based on the electrical signal, a complex transfer function CTF(f) of the FUT, and obtaining an output pulse based on the measured complex transfer function CTF(f) from one or a plurality of launch conditions and an assumed input pulse using the equation $P_{out}(t) = \mathcal{F}^{-1}(CTF(f) * \mathcal{F}(P_{in}(t)))$ wherein $P_{out}(t)$ is the output pulse, $\mathcal{F}^{-1}(CTF(f) * \mathcal{F}(P_{in}(t)))$ is the inverse Fourier transform of the function $CTF(f) * \mathcal{F}(P_{in}(t))$, and $\mathcal{F}(P_{in}(t))$ is the Fourier transform of the assumed input pulse.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
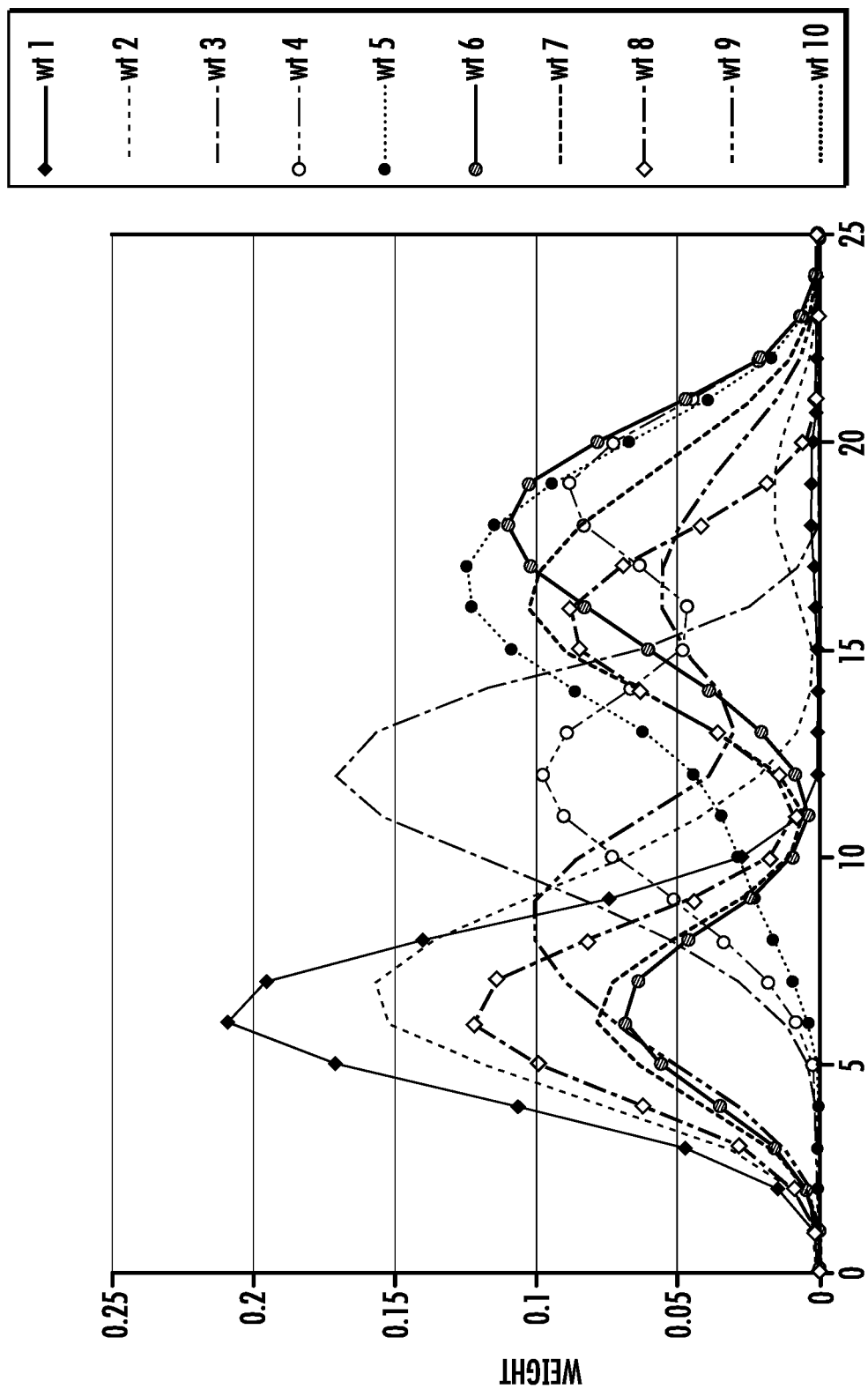
FIG. 1 shows a plot of 10 weights with their corresponding launch offsets for a multimode optical fiber, according to embodiments of the present disclosure.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

Cartesian coordinates are used in some of the Figures for the sake of reference and ease of illustration and are not intended to be limiting as to direction or orientation. The z-direction is taken as the axial direction of the optical fiber.

The acronym VCSEL stands for "vertical cavity surface emitting laser."

The term "fiber" as used herein is shorthand for optical fiber.

The coordinate r is a radial coordinate, where r=0 corresponds to the centerline of the fiber.

The symbol "µm" is used as shorthand for "micron," which is a micrometer, i.e., $1 \times 10^{-6}$ meter.

The symbol "nm" is used as shorthand for "nanometer," which is $1 \times 10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The term group index (or group refractive index) $n_g$ of a material is defined as the ratio of the vacuum velocity of light c to the group velocity $v_g$ in the medium using Equation (1):

$$n_g = \frac{c}{v_g} = c\frac{\partial k}{\partial \omega} = \frac{\partial}{\partial \omega}(\omega n(\omega)) = n(\omega) + \omega \frac{\partial n}{\partial \omega} \quad (1)$$

where k is the wave number in the medium (which is equal to $2\pi*n$/wavelength), $\omega$ is angular frequency, and n is refractive index. For calculating the group refractive index, one needs to know not only the refractive index at the wavelength of interest, but also its frequency dependence. The group refractive index is used to calculate time delays ($\tau$) for pulses propagating in a medium, where $$\tau = \frac{L}{v_g} = \frac{L*n_g}{c},$$

where L is the length of the medium.

The term "group delay" is the time for an optical signal to pass from an input end to an output end of a fiber. Group delay is also known as time of flight or propagation time and is typically measured in nanoseconds.

The term "skew" is defined as the difference between the group delay of simultaneously launched signals propagating within two or more cores of a multicore optical fiber. The skew can also be referred to as inter core skew (ICS).

The term "bandwidth" is denoted BW and as the term is used herein is the modal bandwidth of a multimode optical fiber. For purposes of this disclosure, the modal bandwidth is also the effective modal bandwidth and is also denoted EMB. The modal bandwidth is the capacity of an optical fiber measured in MHz*km or GHz*km. In some embodiments, the modal bandwidth can be obtained from the transfer function, and it may be the modulation frequency when the transmission through the fiber drops by 6 $dB_e$ (defined as $20*\log 10(x)$) (or 3 $dB_0$, which is defined as $10*\log 10(x)$) from the transmission value when modulation frequency is equal to 0 Hz. It is also noted that modal bandwidth is related to and exhibited by the differential mode delay (DMD) of a fiber. Actually, the EMB as defined by the standard is measured through the DMD measurement with calculations to obtain the EMB. When multiple modes of light travel through a multimode fiber, lower order modes travel through the fiber near its center core, while higher order modes travel closer to the outside edge of the core. As is known in the art, lower and higher order modes can travel at different velocities within the fiber, and the DMD is the difference in travel time between the different modes. The smaller the DMD, the less the light spreads out from the fiber and the higher the modal bandwidth. The EMB of a multimode fiber can be measured and calculated using the following standards: FOTP-220 (TIA-455-220-A), "Differential Mode Delay Measurement of Multimode Fiber in the Time Domain" (January 2003) and IEC 60793-1-41 Ed. 3.0: Optical fibres: Part 1-41: Measurement methods and test procedures-Bandwidth.

Chromatic dispersion is the sum of the material dispersion, waveguide dispersion, and inter-modal dispersion of the fiber. In the case of a single mode waveguide fiber, the inter-modal dispersion is zero. The zero dispersion wavelength ($\lambda_0$) is the wavelength at which the dispersion has a value of zero. Chromatic dispersion slope is the rate of change of the dispersion with respect to wavelength. Chromatic dispersion and dispersion slope are reported herein at a wavelength are expressed in units of ps/(nm·km) and ps/($nm^2$·km), respectively.

As explained in the two standards, for a multimode fiber, the EMB is calculated using 10 EMB weights, or 10 assumed launch conditions that are weighted radially by power. FIG. 1 shows a plot of the 10 EMB weights with their corresponding launch offsets.

Conventionally, DMD measurements are done in the time domain and include launching an input pulse at the input of the multimode fiber over a sequence of offsets $r_j$, such as, for example, offsets of 1, 2, ... 27 microns or offsets of 1, 3, 5, 7, ... 27 microns such that ($P(r_j, t)$) is the measured output pulse at the offset $r_j$ as a function of time. Next, the output pulses of the sequence of offsets are measured using equation (2). The measured output pulses over a sequence of offsets are assembled into 10 pulses based on the 10 EMB weights ($W_i(r)$, i=1, 2, 3, ..., 10) shown in FIG. 1, $$P_{out,i}(t) = \Sigma_j W_i(r_j) \cdot P(r_j, t) \quad (2)$$

where $P_{out,i}(t)$ is the output pulse function associated with each weight as a function of time (t). Then, the transfer function of the assembled 10 pulses is calculated based on a ratio of the Fourier transform of the 10 weighted pulses and the Fourier transform of the input pulse. The modal bandwidth of the assembled pulses is then determined and referred to as EMBc with 10 values corresponding to the 10 weights. The minimum value of the 10 $EMB_c$ values is referred to as minEMBc. The EMB is defined as EMB=1.13*minEMBc.

Embodiments of the present disclosure include a system for measuring transfer functions and in particular complex transfer functions from various launch conditions to determine an EMB of an optical fiber, such as a multimode fiber. Embodiments of the present disclosure also include a system for measuring transfer functions and in particular complex transfer functions from various launch conditions to determine chromatic dispersion and skew of an optical fiber, such as a multicore fiber. For purposes of this disclosure, the term transfer function is the magnitude of the complex transfer function and the term complex transfer function includes additional phase information. The multimode fibers disclosed herein may have a 50 micron core diameter, or a 62.5 micron core diameter, or other non-conventional diameters such as 30 micron, 70 micron, 80 micron, or 100 micron core diameter. The multicore fibers may have multiple single mode cores, for example 2 cores, 4 cores, 8 cores, or even more arranged in various geometric configurations as is known in the art.

A multimode fiber has many mode groups, and in each mode group there are a number of modes. For a conventional 50 micron diameter core multimode fiber (such as an OM2, OM3, or OM4 fiber) at 850 nm, there are in general 19 mode groups and such a fiber supports more than 90 non-degenerate modes. The systems disclosed herein measure a transfer function of a fiber, such as a multimode fiber at the wavelength of measurement or operation, using a frequency domain method.

Figure 2:
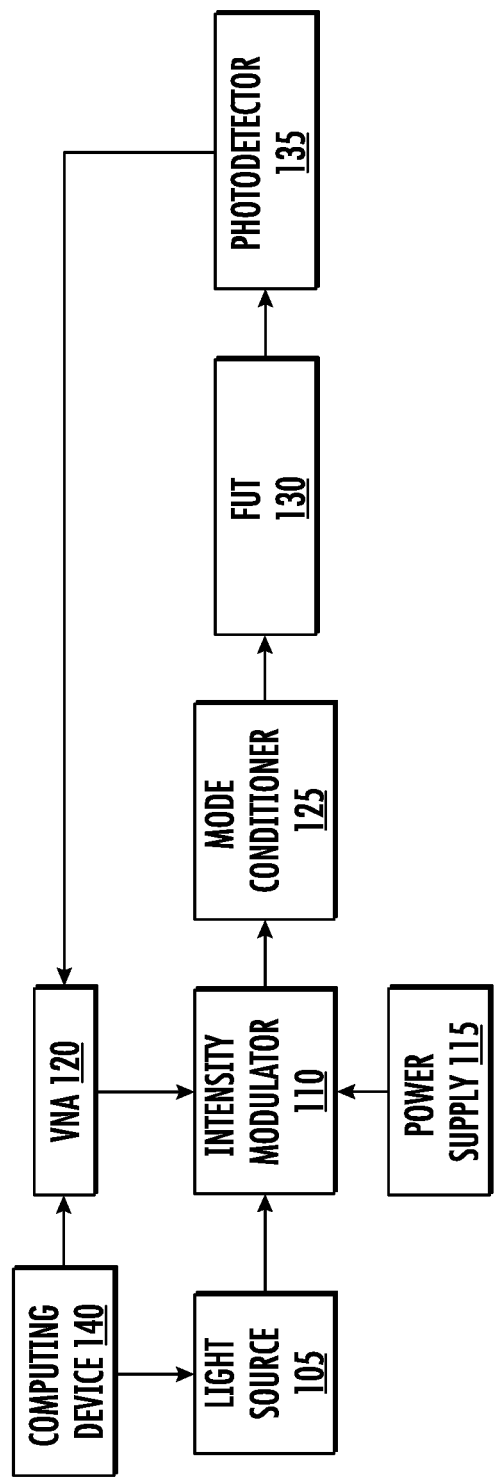
FIG. 2 illustrates an exemplary system for measuring a modal bandwidth, according to embodiments of the present disclosure.

FIG. 2 illustrates a system for measuring the transfer function and complex transfer function of an optical fiber for a given launch condition, according to some embodiments. For example, a system 100 includes a light source 105, an intensity modulator 110, a power supply 115, a vector network analyzer (VNA) 120, a mode conditioner 125, a fiber under test (FUT) 130, an optical receiver 135 (e.g., a photodetector), and a computing device 140. In some embodiments, the VNA 120 may generate RF signals with frequencies sweeping over a frequency range to drive the intensity modulator 110 to convert the light from light source 105 into intensity modulated optical signals for launching into the FUT 130. The optical signal may further pass through the mode conditioner 125 before launching into the FUT 130. After the optical signal propagates through the FUT 130, it may be received by the optical receiver 135, which may convert the optical signal(s) back into electric signal(s). The converted electrical signal(s) may be analyzed by the VNA 120. For example, the VNA 120 may detect how the optical signal(s) changed or attenuated over the frequencies of the frequency sweep and, as a result, a transfer function may be obtained or measured.

The FUT 130 may comprise an optical fiber operating at a wavelength between 800 nm and 1650 nm, or between 840 nm and 1100 nm. In some embodiments, the FUT 130 may operate at a wavelength between 1260 nm and 1360 nm (e.g., around 1310 nm) or at a wavelength between 1400 nm and 1600 nm (e.g., around 1550 nm). Additionally, the FUT 130 may be a step-index fiber or a graded-index fiber. As discussed above, the FUT 130 may be a multimode optical fiber or a multicore optical fiber.

In some embodiments, the light source 105 may be a super-luminescent diode, a laser source configured to emit light at a select wavelength, a tunable laser, or a laser such as DFB laser with fixed wavelength, or the like. For example, the light source 105 may be a narrow linewidth light source (e.g., around 0.05 nm or less). The light source 105 may be configured to provide polarized light that is modulated by the intensity modulator 110. In other embodiments, the light source 105 may be a VCSEL that is directly modulated such that the intensity modulator 110 is built in the VCSEL 105 to generate the intensity-modulated light.

Figure 9A:
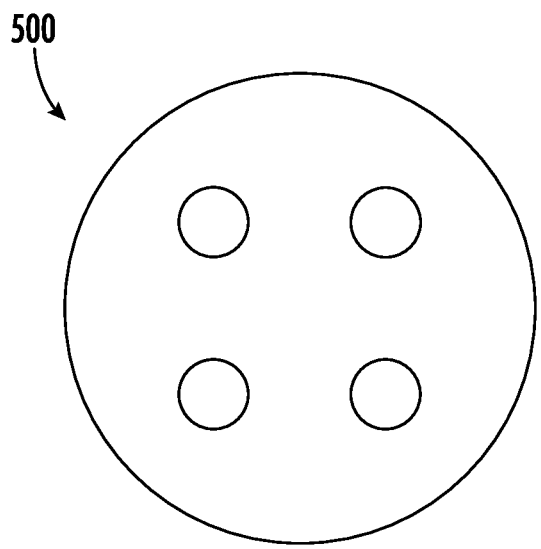
FIG. 9A shows a cross-section of an exemplary multicore optical fiber, according to embodiments of the present disclosure.

In some embodiments, the computing device 140 (measuring system) may be electrically connected to the VNA 120 and the light source 105 to control the operation of the light source 105. In some embodiments, the computing device 140 and the VNA 120 may be a computing device, such as the example computing device illustrated in FIG. 9.

In some embodiments, the intensity modulator 110 may include at least two electric ports, such that one port receives a DC bias control voltage and the other port receives frequency control signals. For example, the power supply 115, which sets the DC bias control voltage, may be electrically connected to a first electric port and the VNA 120 may be electrically connected to the second electric port. A modulating frequency provided by the intensity modulator 110 may be controlled by the VNA 120. For example, the VNA 120 may provide the frequency control signal to the intensity modulator 110 to sweep a modulation frequency over a frequency range. In some embodiments, the frequency range may be between 10 MHz and 40 GHz, between 10 MHz and 30 GHz, between 100 MHz and 20 GHz, or between 100 MHz and 15 GHz. The frequency range may be set depending on the lengths of the fiber and the modal bandwidth that is measured. For example, the longer the optical fiber, the lower the upper frequency should be. And the higher the modal bandwidth needed to be measured, the higher the upper frequency should be. Thus, the frequency control signal from the VNA 120 may be used to control the intensity modulator 110, such that the intensity modulator 110 converts light from the light source 105 into intensity-modulated light to be used as intensity-modulated optical signals for launching into FUT 130. In some embodiments, the intensity modulator 110 may be a lithium-niobate-based modulator.

In some embodiments, the intensity-modulated light from the intensity modulator 110 may be provided to the mode conditioner 125. The mode conditioner 125 may be configured to change launching conditions of the light. In some embodiments, the mode conditioner 125 may be an off-the-shelf device. An exemplary commercial mode conditioner 125 may generate a Gaussian light intensity profile radially across the FUT 130. The launch conditions from this type of multi-mode mode conditioner 125 may be similar to the launch conditions from a VCSEL. In other embodiments, the mode conditioner 125 may be a customized device that is designed to provide select launch conditions for various types of lasers and optics. For example, the mode conditioner 125 may be an offset-based mode conditioner configured to provide essentially arbitrary launch conditions to replicate the launch conditions that can occur between a light source and a fiber. In other embodiments, the mode conditioner 125 is a single mode fiber at the laser operating wavelength or optics (such as lenses) to provide the equivalent effect of having a single mode spot, as produced by a single mode fiber. For example, for measurement at 850 nm, the single mode fiber has a mode field diameter of about 5 microns. Such a singe mode fiber launch is used in DMD measurements and the single mode fiber is positioned at a set of controlled offsets relative to a center of the FUT. The measurements are done at the set of controlled offsets. For traditional multimode fibers with 50 micron core diameters, the offset can go through the values of, for example, 1, 3, 5, . . . 27 microns or 1, 2, 3, 4, . . . 27 microns.

In some embodiments, the modulated light exits mode conditioner 125 as mode-conditioned intensity-modulated light. A linewidth of the mode-conditioned intensity-modulated light may be less than about 0.1 nm, or less than about 0.075 nm, or less than about 0.05 nm, or less than about 0.025 nm, or less than about 0.01 nm, or less than about 0.005 nm, or less than about 0.001 nm such that linewidth is the width (the full width at half-maximum, FWHM) of the optical spectrum of the light.

In some embodiments, the mode conditioner 125 may be optically coupled to the FUT 130, such that the mode-conditioned intensity-modulated light enters the FUT 130 through a first end as a guided wave and exits the FUT 130 at a second end. The FUT 130 may have a length of, for example, about 20 km or less, or about 15 km or less, or about 10 km or less, or about 5 km or less, or about 2 km or less, or about 1 km or less. Additionally or alternatively, the FUT 130 may have a length of, for example, about 1 km or greater, or about 2 km or greater, or about 5 km or greater, or about 10 km or greater, or about 15 km or greater, or about 17 km or greater, or about 20 km or greater, or about 24 km or greater. In some embodiments, the length of the FUT 130 is in a range from about 2 km to about 20 km, or about 4 km to about 18 km, or about 6 km to about 16 km, or about 8 km to about 14 km. Some exemplary lengths include 2.2 km, 4.4 km, 8.8 km, and 17.6 km.

In some embodiments, the output light from the FUT 130 is detected by an optical receiver, which may convert output light signals into, for example, an electrical signal(s). In some embodiments, the optical receiver may be, for example, a photodetector 135. In some embodiments, the electrical signal(s) may be linearly amplified either within photodetector 135 or by an external amplifier (not shown). The electrical signal(s) may then be provided to and analyzed by the VNA 120. For example, in some embodiments, the VNA 120 may calculate a transfer function of the FUT 130 based upon multiple pairs of modes of the FUT 130.

Figure 3:
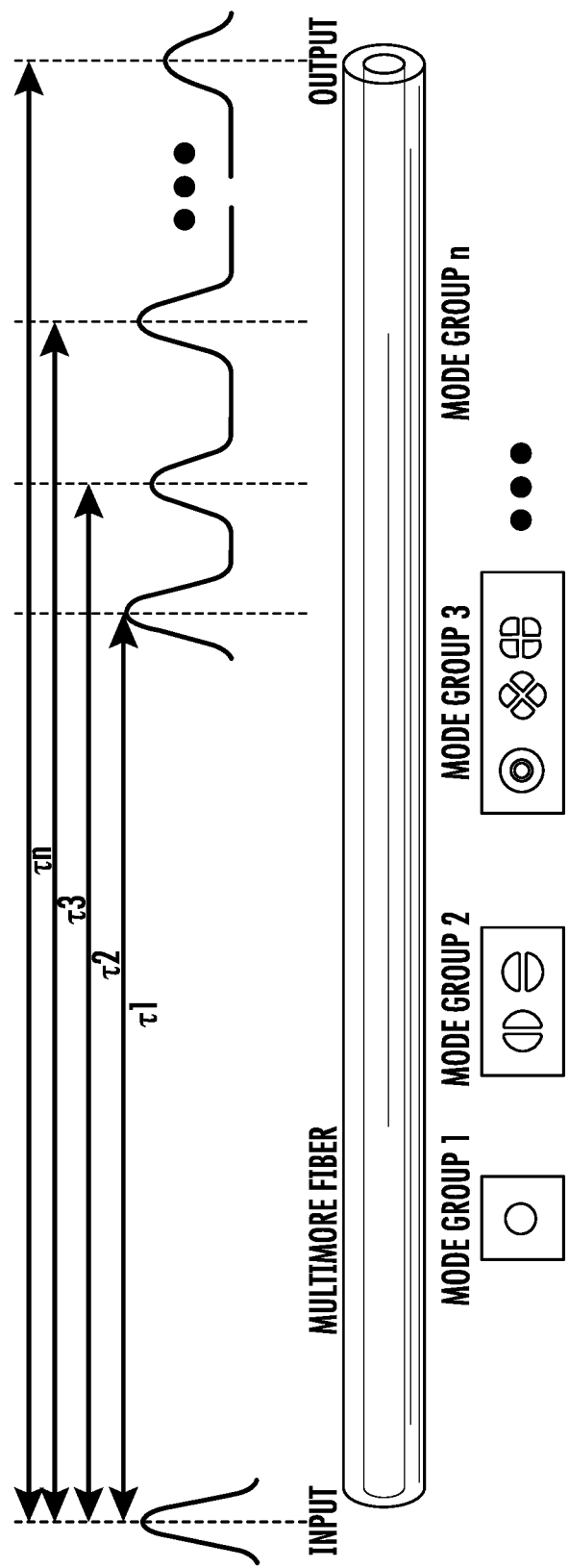
FIG. 3 illustrates example modes based on an input into a multimode optical fiber, according to embodiments of the present disclosure.

FIG. 3 illustrates the light propagation in a fiber using the time domain concept. Through this illustration, it will be explained how the time domain concept is connected to the frequency domain concept, which is used in the embodiments of the present disclosure. Multimode fibers can each guide a large number of modes, and the light excited into each mode n travels through the fiber with a time delay of $\tau_i$. Furthermore, multicore fibers can each guide a large number of modes, such that each core guides a separate mode. The light excited into each core n also travels through the multicore fiber with a time delay of $\tau_i$. The amount of light excited into each mode/core can be described by the coefficient $a_j$.

In the illustrative example depicted in FIG. 3, n number modes are launched simultaneously into an optical fiber as a single input pulse. The modes propagate through the FUT 130 with different propagation constants. A delay between the modes develops and the output pulses for the modes are detected at different times, with $\tau_1$, $\tau_2$ and $\tau_n$ being the time of flight or the time of detection of modes at the output of the FUT 130 relative to the time of launch (also referred to as the modal delay time of each of the modes). The difference between the time of flights is referred to as skew of an optical fiber. The time of flight is measured in ps or ns (or when normalized to unit length, it is measured in ps/m or ns/km).

The exemplary methods disclosed herein are based on measuring the complex transfer function (CTF). Therefore, the CTF is derived first. Although the transfer function concept is more for frequency-domain treatment, it is derived using time-domain representation. Throughout the disclosure, the input signal is denoted by $H_{in}(t)$ in the time domain and $\hat{H}_{in}(f)$ in the frequency domain, with $\hat{H}_{in}(f)$ being the Fourier transform of $H_{in}(t)$, and the output signal of the FUT 130 is denoted by $H_{out}(t)$ and $\hat{H}_{out}(f)$ in the time domain and frequency domain, respectively. FIG. 3 schematically illustrates one example of measured CTF using a multimode fiber as the FUT 130. When one input pulse is launched into the multimode fiber with n modes, the output consists of n pulses resulting from the different propagation constants of the n modes. The detailed sequence of modal delay for each mode depends on the refractive index profile and can change over wavelength. Assuming that the input pulse is described by $H_{in}(t)$ in the time domain and $\tilde{H}_{in}(f)$ in the frequency domain, which is basically the Fourier transform of $H_{in}(t)$, the output pulse in the time domain is calculated using equation (3):

$$H_{out}(t) = \sum_{j=1}^{n} a_j \cdot H_{in}(t - \tau_n) \quad (3)$$

where $\tau_n$ is the time of flight of the n-th modes over the FUT 130 and $a_j$ is the amount of light excited into each mode.

The output pulse in the frequency domain can therefore be calculated using equation (4):

$$\tilde{H}_{out}(f) = \mathcal{F}\left[\sum_{j=1}^{n} a_j \cdot H_{in}(t - \tau_n)\right] = \tilde{H}_{in}(f) \cdot \sum_{j=1}^{n} a_j \cdot \exp(-i \cdot 2\pi f \tau_n) \quad (4)$$

The CTF is then obtained using equation (5):

$$CTF(f) = \frac{\tilde{H}_{out}(f)}{\tilde{H}_{in}(f)} = \sum_{j=1}^{n} a_j \cdot \exp(-i \cdot 2\pi f \tau_n) \quad (5)$$

The VNA 120 measures the transfer function, in particular the complex transfer function CTF(f) without measuring input and output optical pulses, since it functions as a frequency domain instrument. The full operating principle is explained in the book: Joel P. Dunsmore, "Handbook of Microwave Component Measurements with Advanced VNA Techniques", 2012 John Wiley & Sons, Ltd., which is incorporated by reference herein in its entirety. Using the setup in FIG. 2, the VNA 120 measures the transfer function or complex transfer function of the multimode fiber for a given launch condition.

At this point, the complex transfer function CTF(f) is obtained but it is limited to frequency domain information. To obtain the time domain information, an inverse Fourier transform is needed. However, the frequency domain information, from the CTF(f), was obtained using a finite number of sampling points. Therefore, when switching from the frequency domain to the time domain, as discussed further below, equation (6) must be satisfied to ensure that the time domain information does not have aliasing or ambiguity (due to the limited number of sampling points in the frequency domain information).

In accordance with the Nyquist theorem, the frequency step df must meet the condition of equation (6) in order to prevent aliasing and/or ambiguity in the time domain information, wherein the frequency step df is the frequency increment when sweeping over the full frequency range in the time domain.

$$2 \cdot \max(\tau_1, \ldots, \tau_n) \leq 1/df \quad (6)$$

where $(\tau_1, \ldots \tau_n)$ is the time of flight associated with each mode. As discussed above, time of flight is the time the signal enters the fiber to the time it exits the fiber for a particular mode or for a particular core. The time of flight is also referred to as group delay. As shown in equation (7), the frequency step df is determined based on the frequency span $\Delta f$, which is the frequency range at which the VNA 120 conducts the measurement, and a number of sampling points (NOP) in the frequency domain.

$$df = \Delta f/(NOP-1) \quad (7)$$

As an example, for a multimode fiber with a length of 200 m and a group refractive index of about 1.45, the time of flight through the fiber (the time the signal enters the fiber to the time it exits the fiber) is about 967 ns. Therefore, over a frequency span of 10 MHz to 8 GHz, a number of sampling points NOP of about 15,473 is required to not incur any aliasing in the time domain information. It is noted that the higher the group refractive index, the longer the time delay of the modes traveling through the fiber and, therefore, the longer the time of flight through the fiber. Furthermore, the longer the time of flight through the fiber, a greater number of sampling points NOP are required to not incur any aliasing.

As discussed above, to obtain the time domain information from the frequency domain information, an inverse Fourier transform is needed. The inverse Fourier transform is based on the following definitions of a vector $X=\{x_j\}=\{x_1, x_2 \ldots x_N\}$ into another vector $Y=\{y_k\}=\{y_1, y_2 \ldots y_N\}$ such that $Y = \mathcal{F}(X) = \text{fft}(X)$, and correspondingly the inverse Fourier transform of Y into X so that $X = \mathcal{F}^{-1}(Y) = \text{ifft}(Y)$, are defined as:

$$Y(k) = \sum_{j=1}^{N} X(j) \cdot e^{\frac{-i 2\pi (j-1)(k-1)}{N}} \quad (8)$$

-continued $$X(j) = \frac{1}{N}\sum_{k=1}^{N} Y(k) \cdot e^{\frac{i2\pi(j-1)(k-1)}{N}} \quad (9)$$

where N is the length of the vector.

By obtaining the discrete inverse Fourier transform, one can then obtain the time domain information, specifically with discrete data points that are separated from each other by a time step dt. The time step dt is related to frequency span $\Delta f$ by the following equation (10):

$$dt = 1/\Delta f \quad (10)$$

The output pulse for a given launch condition is then determined based upon the complex transfer function CTF (f). More specifically, as shown in equation (11), an inverse Fourier transform is performed on the product of the complex transfer function CTF(f) multiplied by the Fourier transform of the input pulse to obtain the output pulse of the fiber.

$$P_{out}(t) = \mathcal{F}^{-1}(cTF(f) * \mathcal{F}(P_{in}(t))) \quad (11)$$

In one example, for a 200 m long multimode fiber and 8 GHz frequency span $\Delta f$, the time step dt is 125 ps, which provides too poor of resolution for determining the time domain information. Instead, a resolution on the order of sub-picosecond is required. In order to increase the time domain resolution, the complex transfer function CTF(f) is "padded" with zeros at the high frequency end so that the frequency span $\Delta f$ of the complex transfer function CTF(f) increases. For example, the CTF(f) may be padded with zeros by increasing the frequency span by a factor of 10, or 100, or 1000 to increase the resolution of the time step dt, as discussed above with regard to equation (10). In some embodiments, the frequency span reaches up to 80 GHz, 800 GHz, or 8000 GHz when the initial frequency span is only 8 GHz. Therefore, when calculating the Fourier transform, the complex transfer function CTF(f) is "padded" to add more data points for the complex transfer function CTF(f). For example, in the above example, if the complex transfer function CTF(f) is "padded" by a factor of 100 or when the frequency span reaches 800 GHz, the resolution of the time step dt is increased by a factor of 100 to provide a time step dt of 1.25 ps. A time step dt of about 10 ps or less provides sufficient resolution for determining the time domain information. In some embodiments, a time step dt of about 9 ps or less, or about 8 ps or less, or about 7 ps or less, or about 6 ps or less, or about 5 ps or less, or about 1 ps or less was used.

Without meeting the condition of equation (6), the discrete Fourier transform will not fully resolve the times of flight. When the data is under-sampled, such that the number of sampling points NOP is not large enough, there is an ambiguity when determining the value of $\tau_n$ through discrete Fourier or inverse Fourier transformation. The peak value $\tau_n$ in the Fourier spectrum can take the value as shown in equation (12):

$$\tau_n = \frac{k}{df} \pm t_n \quad (12)$$

where k is an integer and $t_n$ is the time position of the peaks after the inverse Fourier transform. The correct time of flight can be determined by finding the proper k to de-alias the signals. This is done by estimating the time of flight of the fiber and finding the integer k in equation (12) that is nearest to the estimated value. The time of flight can also be obtained by measuring a shorter piece of the fiber sample with sufficient sampling meeting equation (6) and determining the time of flight by scaling the value to longer fiber length. However, when df satisfies the condition in equation (6), such ambiguity disappears. For a fiber with 200 m length and group refractive index around 1.45, the time of flight is around 967 nanoseconds. If a frequency span of 10 MHz to 8 GHz is chosen, the NOP required without incurring aliasing is around 7727.

Next, the complex transfer function CTF(f) is transformed by canceling the fast oscillating term due to the large absolute delay of the modes to obtain a transformed complex transfer function CTF'(f), which is different from the original complex transfer function CFT(f) by a phase term, as shown in equation (13):

$$CTF'(f) = e^{i2\pi \tau_f f_j} \cdot CTF(f) \quad (13)$$

where e is the Euler's number (a mathematical constant approximately equal to 2.71828), i is the imaginary unit, $\tau_f$ is the approximate group delay of the FUT 130 (which is calculated as discussed further below), and $f_j$ is frequency (which is calculated as discussed below). The transformed complex transfer function CTF'(f) is also termed a modified complex transfer function or de-aliased complex transfer function.

The VNA 120 measures the complex transfer function CTF(f) over a frequency range. Typically, the minimum starting frequency ($f_0$) is about 10 MHz (about 0.01 GHz) and the maximum frequency ($f_1$) is set to the highest allowed by the specific model of the VNA 120 (which can be as high as 40 GHz or higher depending on the model of the VNA). Embodiments of the present disclosure use a maximum frequency $f_1$ of, for example, between about 1 GHz and about 30 GHz. The frequency span $\Delta f$ is the frequency range at which the VNA conducts the measurement (as discussed above) and is the difference between the maximum frequency $f_1$ and the minimum frequency $f_0$ ($\Delta f = f_1 - f_0$). The frequencies that are sampled and used in equation (13) above are calculated according to equation (14):

$$f_j = f_0 + \frac{\Delta f}{NOP - 1} j \quad (14)$$

where $f_j$ is the sampled frequency, $\Delta f$ is the frequency span ($\Delta f = f_1 - f_0$), $f_0$ is the minimum frequency, $f_1$ is the maximum frequency, NOP is the number of sampling points, and j is the index of the sampling points (e.g., j=0, 1, 2, ... NOP−1).

The approximate group delay $\tau_f$ in equation (13) is a value between the minimum and maximum values of $\tau_n$ of equation (12) or within a predefined range of the minimum and maximum values of $\tau_n$. For example, the predefined range may be about 2% or more, or about 5% or more, or about 7% or more, or about 10% or more, or about 15% or more, or about 20% or more, or about 25% or more, or about 30% or more, or about 40% or more of the minimum and maximum values. Therefore, in one embodiment, the predefined range is about 10% so that the $\tau_f$ is within a range between about 10% of the minimum value of $\tau_n$ and about 10% of the maximum value of $\tau_n$. In yet other embodiments, the approximate group delay $\tau_f$ in equation (13) is the maximum $\tau_n$ value for all of the modes. Amongst all the embodiments disclosed herein, the Nyquist sampling requirement is met for all values of $\tau_n$ and $\tau_f$ when the following condition is met:

$$2 \cdot \max(|\tau_1 - \tau_f| \ldots |\tau_n - \tau_f|) \leq 1/df \quad (15)$$

wherein df is the frequency step, as discussed above.

However, it is noted that equation (12) is specific for each peak in the Fourier spectrum (which is associated with a particular mode). But, $\tau_f$ in equation (13) is approximated for all the modes in the FUT 130. The approximate group delay $\tau_f$ in equation (13) is estimated by the length and fiber index profile of the FUT 130 and is calculated according to equation (16):

$$\tau_f = \frac{k}{df} \pm t_f \tag{16}$$

where k is an integer, df is the frequency step, and $t_f$ is the approximate time position of the peaks after the inverse Fourier transform. By applying the calculated approximate group delay $\tau_f$ in equation (13), one can obtain the transformed complex transfer function CTF'(f).

In practice, if the integer k is chosen incorrectly due to slight error in the fiber length information or the fiber index profile information, the approximate group delay $\tau_f$ would also be calculated incorrectly, which could result in further errors in subsequent data processing steps (such as when calculating the transformed complex transfer function CTF' (f)). However, if the minimum frequency $f_0$, the maximum frequency $f_1$, and the number of sampling points NOP meet the following equation (17), error in k can be tolerated while still obtaining a correct transformed complex transfer function CTF'(f). Equation (17) is:

$$f_0 \cdot \frac{(NOP-1)}{\Delta f} = I \tag{17}$$

where $f_0$, NOP, and $\Delta f$ are defined above with regard to equation (14) and I is an integer (e.g., 1, 2, 3, . . . etc.). By meeting the condition of equation (17), the phase term phase term $e^{i2\pi\tau_f f}$ in equation (13) is immune to the error in k (as any error would simply result in an extra $2\pi$ so that the entire phase term remains the same). For example, when $f_0$ is 0.01 GHz and $f_1$ is 10 GHz, the NOP can be chosen to be 1000 so that I is integer 1 and, thus, the conditions of equation (17) are met. As another example, when $f_0$ is 0.01 GHz and $f_1$ is 10 GHz, the NOP can be chosen to be 1999 so that I is integer 2 and, thus, the conditions of equation (17) are met. In other examples, when $f_0$ is 0.01 GHz and $f_1$ is 12 GHz, the NOP can be chosen to be 1200 or 2399 so that I is integer 1 or 2, respectively.

In some embodiments, the transformed complex transfer function CTF'(f) is "padded" with zeros so that the frequency span of the transformed complex transfer function CTF(f) increases to provide a sufficient resolution of the time step dt, as discussed above with regard to the complex transfer function CTF(f).

Next, the output pulse for a given launch condition is determined based upon the transformed complex transfer function CTF'(f). More specifically, as shown in equation (18), an inverse Fourier transform is performed on the product of the transformed complex transfer function CTF' (f) multiplied by the Fourier transform of the input pulse to obtain the output pulse of the fiber.

$$P_{out}(t) = \mathcal{F}^{-1}(CTF'(f) * \mathcal{F}(P_{in}(t))) \tag{18}$$

Thus, the complex function CTF(f) in equation (11) is replaced with the transformed complex transfer function CTF'(f) to provide equation (18).

Even though the measurement to obtain the transformed complex transfer function CTF'(f) was completed in the frequency domain using the VNA 120, the full sweep of information can be obtained as if the measurement was done in the time domain. It is noted that in order to obtain the frequency domain, an input pulse was assumed in a hypothetical time domain setup. By using equation (18) and the transformed complex transfer function CTF'(f), the output pulse through the fiber under the specific launch condition is determined as if an actual time domain measurement system was used. Compared to the real output pulse, the calculated output pulse (using the transformed complex transfer function CFT'(f)) preserves the overall shape of the pulse, such that the only difference between the two pulses is a time shift in the calculated output pulse. It is noted that this time shift does not impact the measurements obtained since the relative modal delays between different fiber modes are the key properties that are of interest.

Once the output pulses are determined, the output pulses are assembled into 10 output pulses based on the 10 EMB weights shown in FIG. 1 and using equation (2). In some embodiments, the assembled output pulse $P_{out}(t)$ is a linear combination of a plurality of output pulses from a set of launch conditions, as shown in equation (19):

$$P_{out}(t) = \Sigma_j c_j \cdot P_j(t) \tag{19}$$

where $P_j(t)$ is the measured j-th output pulse as a function of time as obtained from the j-th mode condition and $c_j$ is the weight used for the j-th output pulse. The modal bandwidth of the multimode optical fiber is then calculated based upon the assembled output pulse $P_{out}(t)$. More specifically, the modal bandwidth is calculated based upon the transfer function, which is the ratio of the Fourier transform of the assembled output pulse $P_{out}(t)$ and the Fourier transform of the assumed input pulse. Specifically, the transfer function is calculated using equation (20):

$$TF_i = 10 \cdot \log 10 \left[ \frac{\mathcal{F}(P_{out,i}(t))}{\mathcal{F}(P_{in}(t))} \right] \tag{20}$$

$$\frac{\mathcal{F}(P_{out,i}(t))}{\mathcal{F}(P_{in}(t))}$$

where $TF_i$ is the transfer function and is the ratio of the Fourier transform of the assembled output pulses over the Fourier transform of the assumed input pulse. This ratio is first calculated and then converted into logarithmic scale. The transfer function is calculated for each EMB weight or linear combination of pulses from a set of offsets, and the modal bandwidth is extracted from each transfer function. This extraction is performed by finding the corresponding frequency when the transmission of the transfer function drops by 3 dB from the f=0 transmission level. In other embodiments, the extraction is performed by finding the corresponding frequency when the transmission of the transfer function drops by 1.5 dB from the f=0 transmission level and by multiplying the corresponding frequency by a factor of $\sqrt{2}$. This second extraction method may be used, for example, if the transfer function does not show a drop of 3 dB. As noted above, the transfer function is calculated for each EMB weight or linear combination of pulses from a set of offsets. Therefore, the corresponding frequency is also determined for each transfer function. In some embodiments, the modal bandwidth (EMB) is then calculated by multiplying the lowest corresponding frequency by 1.13 (EMB=1.13*minEMBc), as also discussed above with reference to equation (2).

Figure 4:
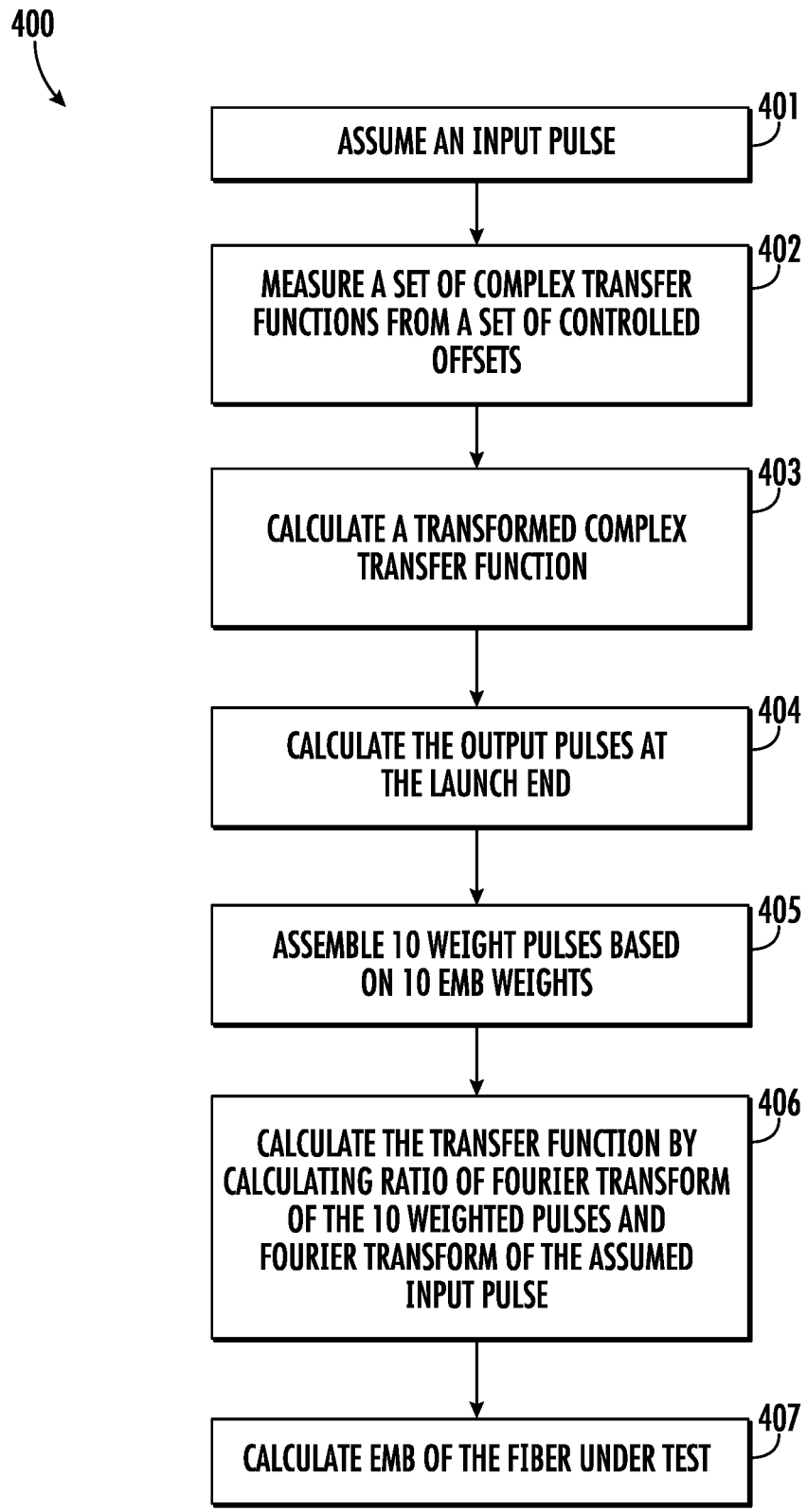
FIG. 4 illustrates an exemplary method for measuring the modal bandwidth, according to embodiments of the present disclosure.

FIG. 4 shows an exemplary process 400 (steps 401-407) according to embodiments of the present disclosure. With the steps of process 400, a frequency domain process can be provided in a form that is similar to a time domain process. In some embodiments, step 402 is performed with data that is under-sampled (equation (6) is not met). In other embodiments, step 402 is performed with data that is sufficiently sampled (equation (6) is met).

Figure 5A:
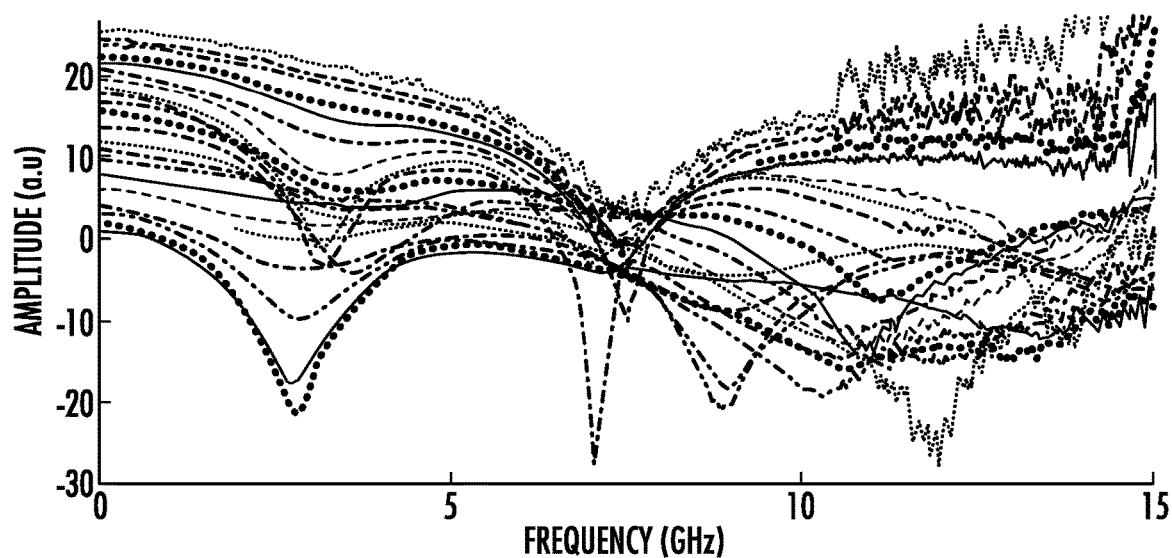
FIG. 5A shows a plot of the magnitude of measured complex transfer functions for a range of offsets, according to embodiments of the present disclosure.

Provided below is an exemplary example illustrating how the modal bandwidth is calculated, according to embodiments of the present disclosure. In this example, the modal bandwidth was measured at a wavelength of 953 nm for a 50 micron core multimode fiber with a length of 2725 m. The input pulse was assumed (step 401 of FIG. 4) as an experimentally generated pulse using an intensity modulator and had a pulse width of about 95 ps. A set of complex transfer functions was then measured from a set controlled offsets (step 402 of FIG. 4). In this example, the controlled offsets $r_j$, varied from 1, 2, 3, . . . 26 microns, and a complex transfer function was obtained from each offset. FIG. 5A depicts a plot of the magnitude of the measured complex transfer functions using the controlled offsets. The complex transfer functions were then converted to transformed complex transfer functions using equations (12) and (13) (step 403 of FIG. 4). In this example, the frequency span $\Delta f$ was 10 MHz to 15 GHz and the NOP was 2001, which provided a frequency step df of 7.495 MHz. Therefore, the frequency step df of 7.495 MHz was used in equation (12) to calculate the $\tau_n$. Furthermore, in this example and with regard to equation (12), the $t_n$ was 60.23 ns based on the location of the maximum peak of the Fourier spectrum, the sign was "−", and k was 101, which provided a T value of 13415.42 ns. After determining the $\tau_n$ value from equation (12), in this example, the T value was used as $\tau_f$ in equation (13) to determine the transformed complex transfer function CTF'(f) for each offset to satisfy the sampling requirements of equation (6). Furthermore, the transformed complex transfer functions CTF'(f) were padded with zeros to enhance the resolution of the time step dt.

Figure 5B:
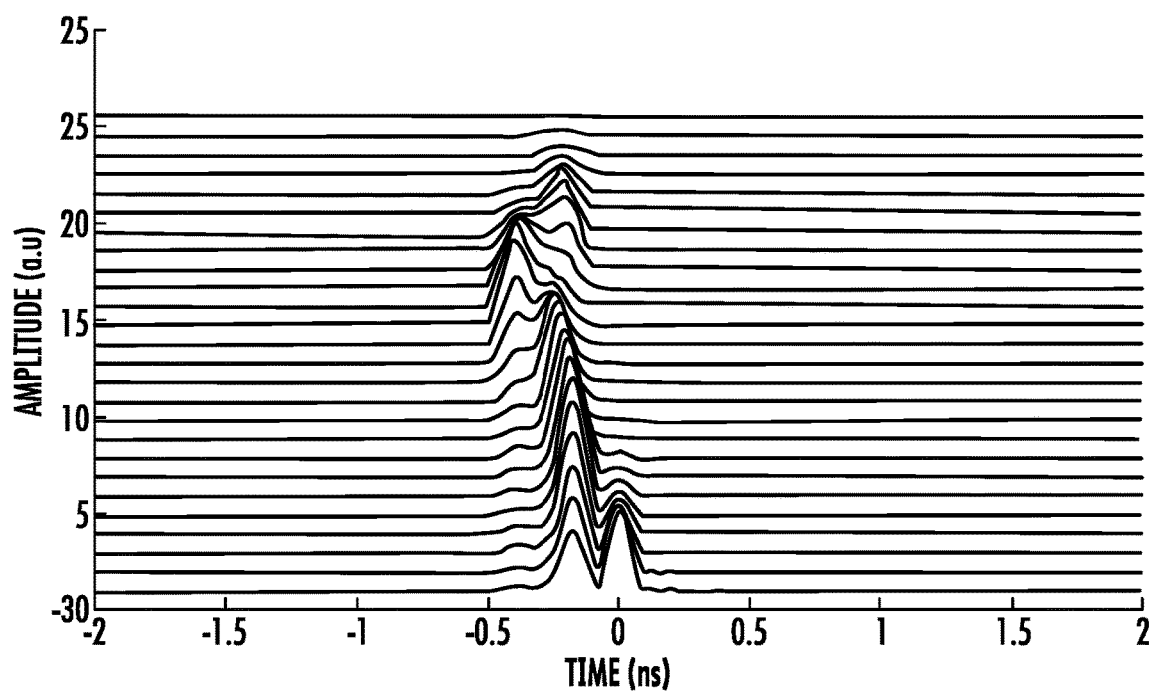
FIG. 5B shows a plot of DMD measurements based upon the measured complex transfer functions of FIG. 5A, according to embodiments of the present disclosure.
Figure 5C:
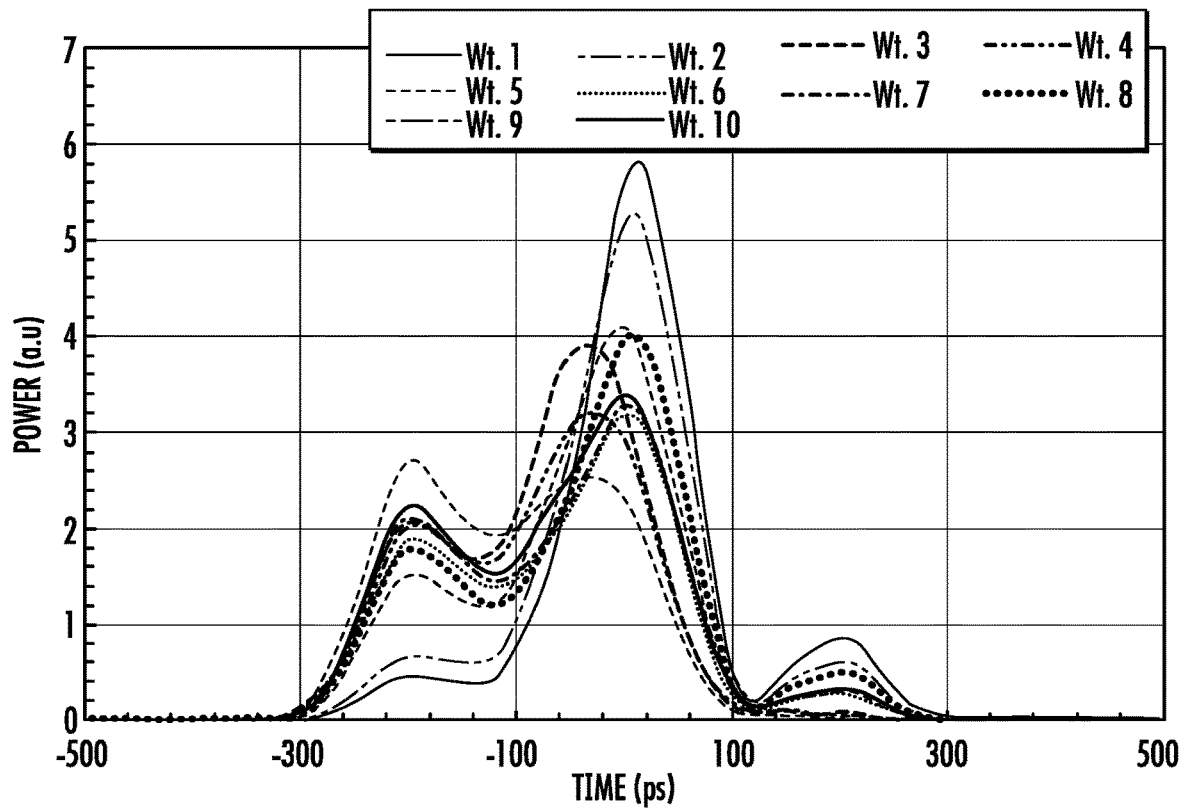
FIG. 5C shows a plot of assembled 10 output pulses based upon the DMD measurements of FIG. 5B, according to embodiments of the present disclosure.
Figure 5D:
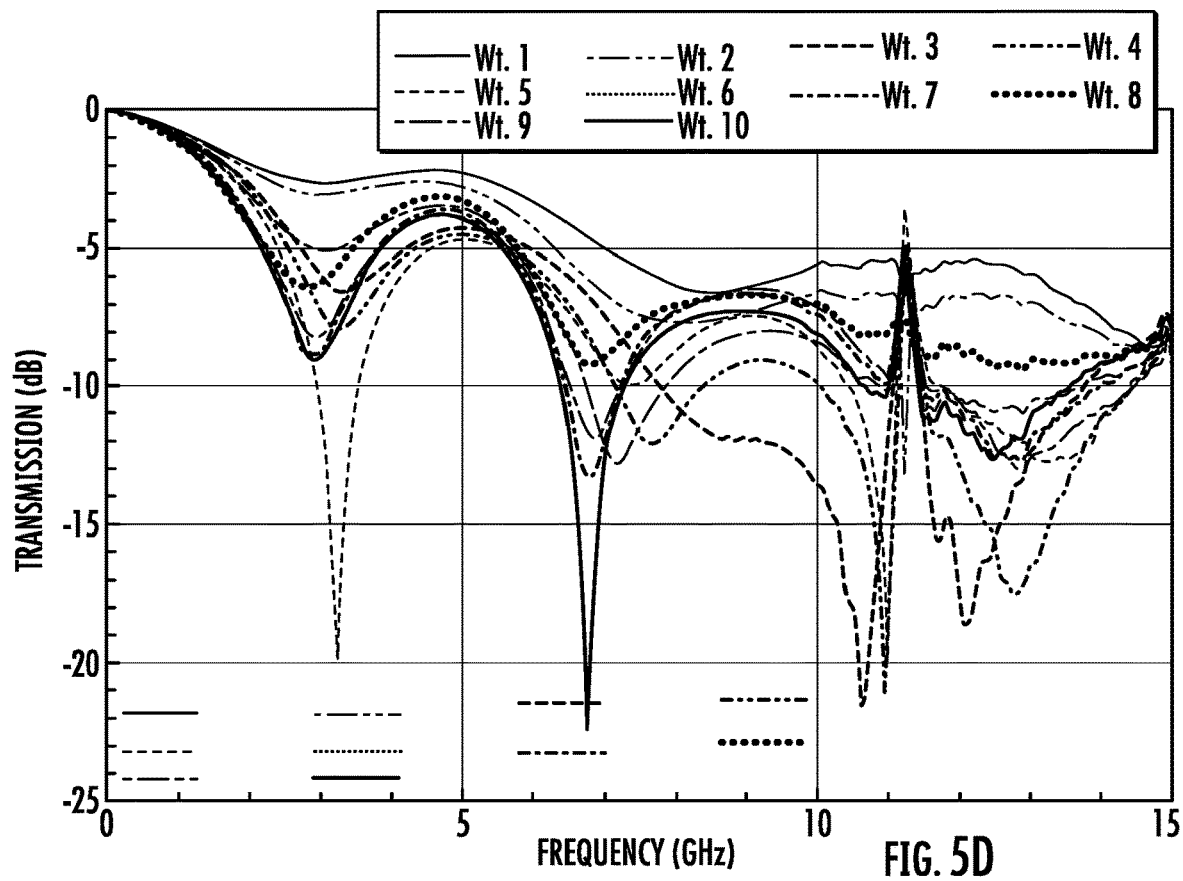
FIG. 5D shows a plot of transfer functions based upon the assembled 10 output pulses of FIG. 5C, according to embodiments of the present disclosure.

Next, the output pulses at the launch end were calculated for each offset based upon the transformed complex transfer functions CTF'(f) and using equation (18) (step 404 of FIG. 4). FIG. 5B shows a DMD chart (output pulses at each offset) calculated from the complex transfer functions for each offset. The measured output pulses were then assembled into 10 pulses based on the 10 EMB weights and using equation (19) (step 405 of FIG. 4), which is illustrated in FIG. 5C. Next, in is this example, the transfer function was determined by calculating a ratio of the Fourier transform of the 10 assembled output pulses and the Fourier transform of the assumed input pulse (step 406 of FIG. 4), as discussed above with reference to equation (20). The calculated transfer functions for this example are shown in FIG. 5D. The modal bandwidth from each transfer function was then extracted. The extractions were performed, in this example, by finding the corresponding frequency of each transfer function, as shown in FIG. 5D, when the transmission dropped by 3 dB from the transmission level when f is equal to 0 GHz. (i.e, a drop in the transmission in FIG. 5D from 0 dB to −3 dB). For example, for the transfer function in FIG. 5D that corresponds to the offset of weight 1, the transfer function drops from 0 dB to −3 dB at a corresponding frequency of 2.343 GHz. The corresponding modal bandwidth of the fiber is then found by multiplying the 3 dB frequency by the length of the fiber, in this example, the length is 2.725 km. The results for each transfer function (corresponding to each weighted offset) are shown in Table 1 below. The minimum frequency value in Table 1 is 4578 MHz*km. This minimum frequency value is then multiplied by 1.13 to determine the modal bandwidth (EMB) of the fiber (step 407 of FIG. 4), which was determined to be: 1.13*4578=5173 MHz*km

TABLE 1

| DMD EMBc | Frequency-Domain EMB (MHz * km) |
| --- | --- |
| Weight 1 | 6384 |
| Weight 2 | 6024 |
| Weight 3 | 5703 |
| Weight 4 | 5567 |
| Weight 5 | 5433 |
| Weight 6 | 4711 |
| Weight 7 | 4607 |
| Weight 8 | 4578 |
| Weight 9 | 5199 |
| Weight 10 | 4632 |
| minEMBc | 4578 |

Figure 6A:
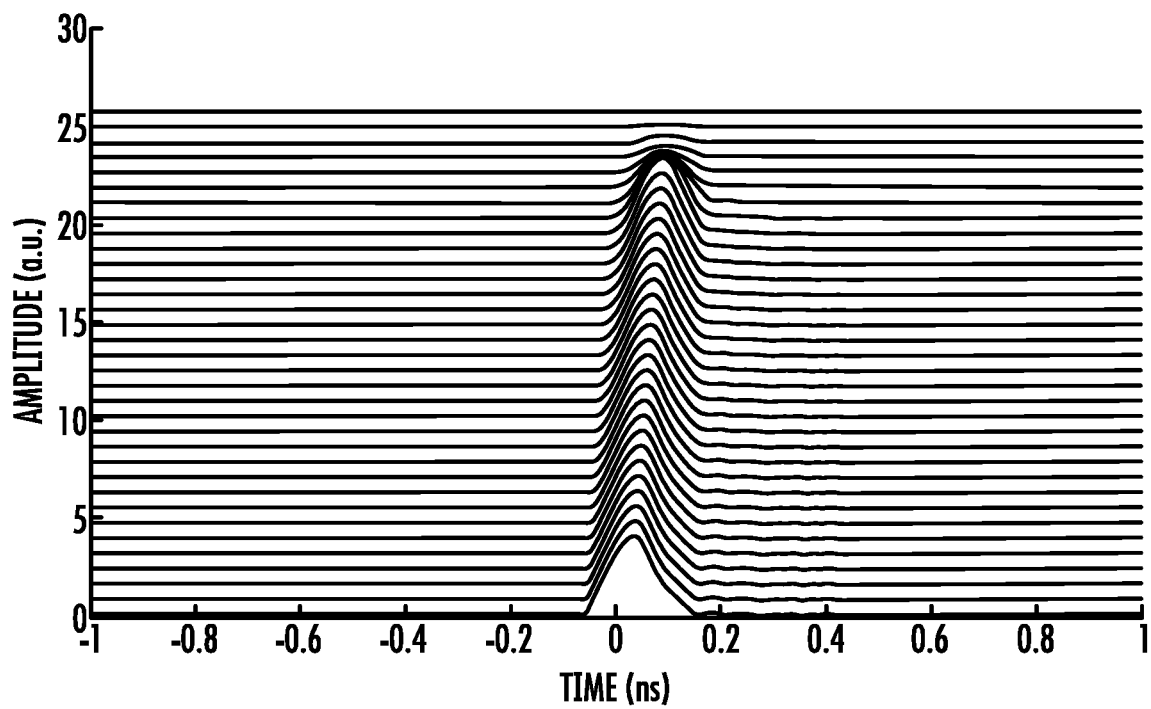
FIGS. 6A and 6B show a comparison of DMD measurements of a 1 km multimode fiber at 850 nm.
Figure 6B:
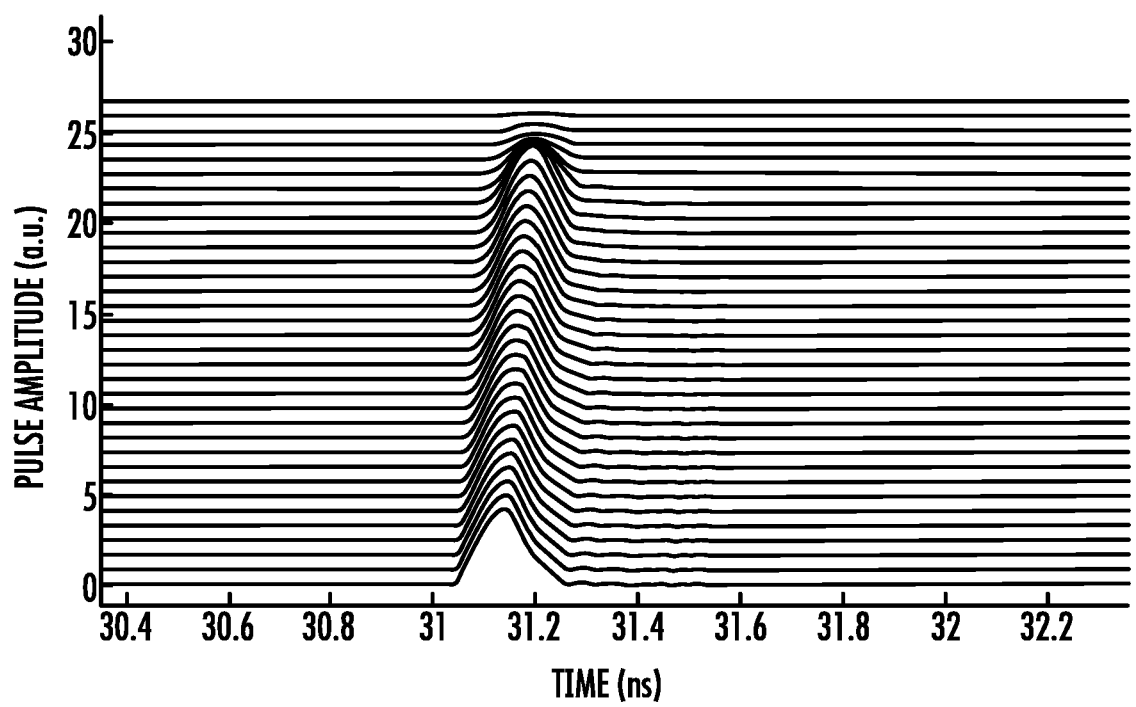

FIGS. 6A and 6B provide a comparison of the effective modal bandwidth measurement results using the frequency-domain DMD method (according to the embodiments disclosed herein) and using the time-domain DMD method for a 1 km long multimode OM4 fiber measured at 850 nm. More specifically, FIG. 6A provides a plot of the frequency-domain DMD method and FIG. 6B provides a plot of the time-domain DMD method. The comparison of FIGS. 6A and 6B shows that the frequency-domain and time-domain DMD methods provide very similar effective modal bandwidth measurement results.

Figure 7A:
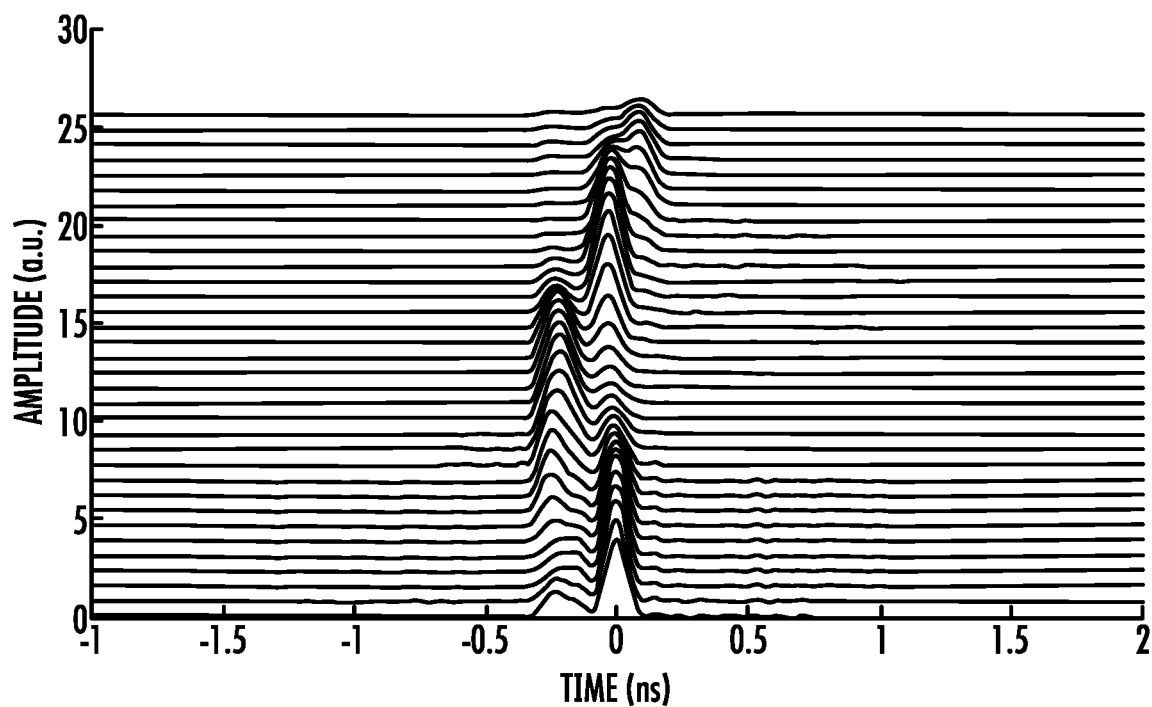
FIGS. 7A and 7B show a comparison of DMD measurements of a 5.634 km multimode fiber at 1000 nm.
Figure 7B:
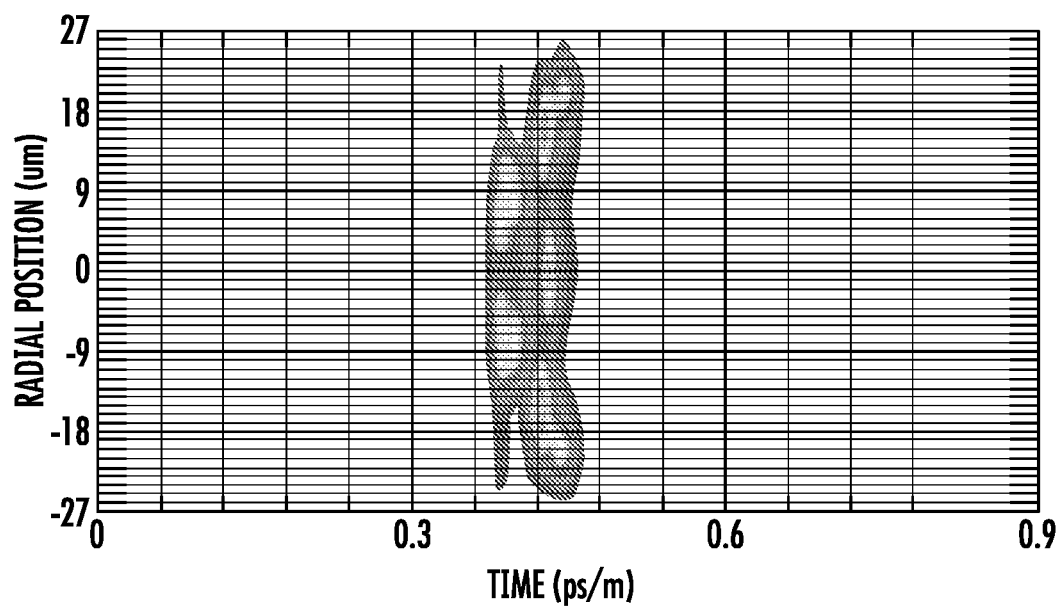

Table 2 below provides a comparison of the effective modal bandwidth measurement results using the frequency-domain DMD method with the results from a time-domain DMD bench (as discussed above) for a 5.634 km long multimode fiber at a wavelength of 1000 nm. The results are also shown in FIGS. 7A and 7B, wherein FIG. 7A provides a plot of the frequency-domain DMD method and FIG. 7B provides a plot of the time-domain DMD bench.

TABLE 2

| DMD EMBc | Time-Domain DMD (MHz * km) | Frequency-Domain EMB (MHz * km) |
| --- | --- | --- |
| Weight 1 | 9326 | 8293 |
| Weight 2 | 9070 | 8423 |
| Weight 3 | 9570 | 10119 |
| Weight 4 | 9111 | 8885 |
| Weight 5 | 10894 | 9752 |
| Weight 6 | 8960 | 9820 |
| Weight 7 | 8964 | 9341 |
| Weight 8 | 8801 | 8885 |
| Weight 9 | 8746 | 8755 |
| Weight 10 | 9122 | 9031 |
| minEMBc | 8746 | 8293 |

As shown in Table 2, the effective modal bandwidth measurement results obtained from using either the frequency-domain DMD method or from using a time-domain DMD bench are very similar for the 10 EMBc values shown.

Any difference in values between the two methods can be attributed to difference in launch offset positions.

Figure 8A:
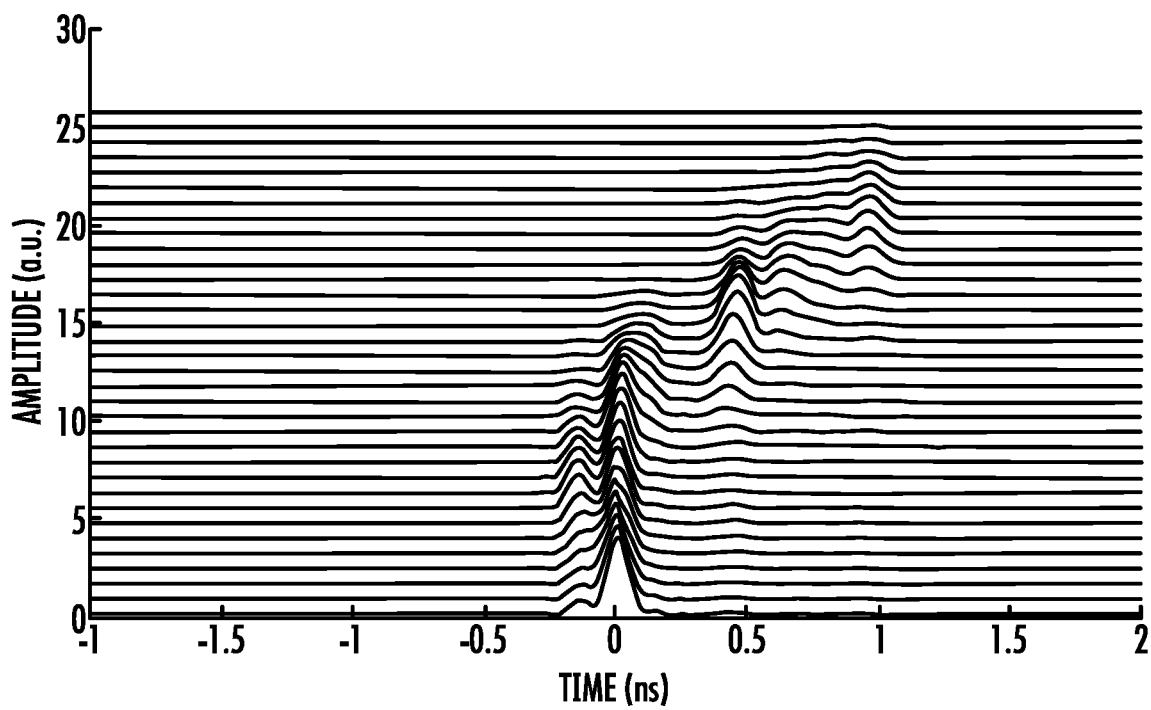
FIG. 8A shows DMD measurements of a 5.634 km multimode fiber at 1060 nm.

The frequency-domain DMD method disclosed herein can also be used at wavelength measurements beyond those of a conventional time-domain DMD bench. Thus, the frequency-domain DMD method disclosed herein may prove useful in emerging long-wavelength optimized multimode fiber applications. Table 3 below provides one such example in which the effective modal bandwidth of a 5.634 km long multimode fiber was measured at a wavelength of 1060 nm. The results of Table 3 are also plotted in FIG. 8A.

TABLE 3

| DMD EMBc | Frequency-Domain EMB (MHz * km) |
|---|---|
| Weight 1 | 12260 |
| Weight 2 | 11606 |
| Weight 3 | 3966 |
| Weight 4 | 2868 |
| Weight 5 | 3211 |
| Weight 6 | 2569 |
| Weight 7 | 2721 |
| Weight 8 | 3099 |
| Weight 9 | 3042 |
| Weight 10 | 3059 |
| minEMBc | 2569 |

Figure 8B:
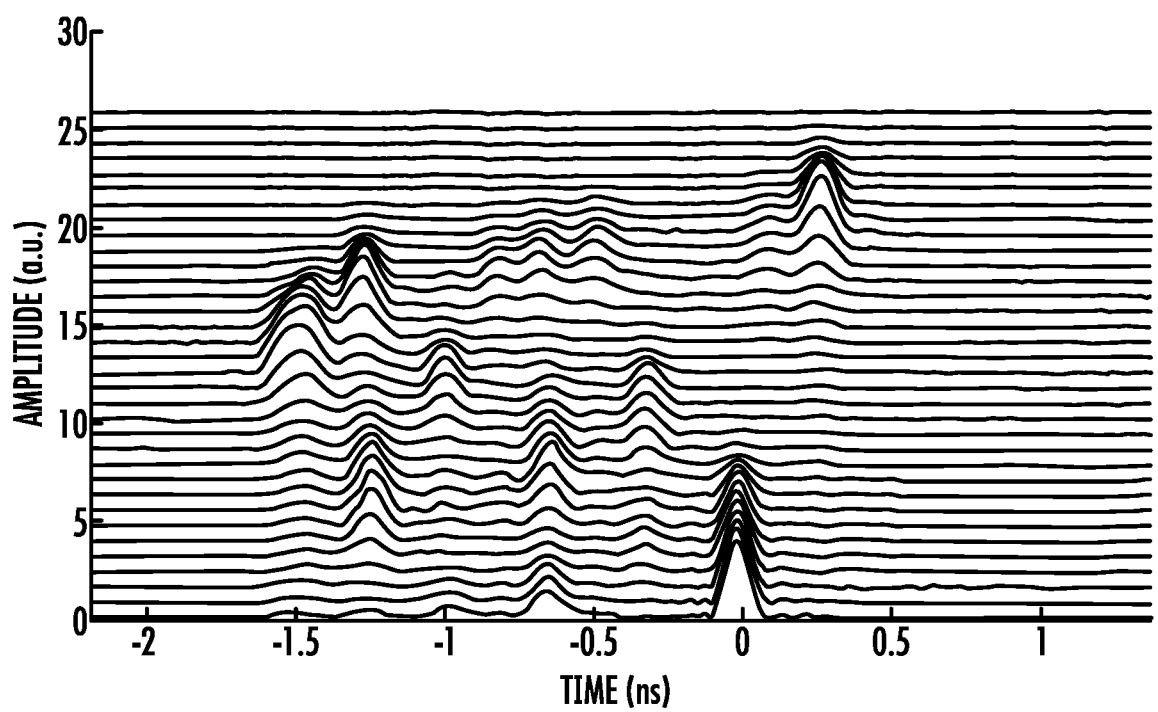
FIG. 8B shows DMD measurements of a 17.1 km multimode fiber at 850 nm.

The effective modal bandwidth for a long multimode fiber with a length of 17.6 km was measured using the frequency-domain DMD method to prove the method works on a long fiber. The fiber had a propagation loss of 38.7 dB and an attenuation of 2.2 dB/km. A laser output of about 13 dBm (20 mW) was used as well as an electrical low-noise amplifier with 27 dB gain, after the photodetector, to further amplify the signal. This setup was used to provide enough power to measure the long fiber. The results are shown in Table 4 below and in FIG. 8B.

TABLE 4

| DMD EMBc | Frequency-Domain EMB (MHz * km) |
|---|---|
| Weight 1 | 5523 |
| Weight 2 | 5437 |
| Weight 3 | 6001 |
| Weight 4 | 4822 |
| Weight 5 | 4856 |
| Weight 6 | 4873 |
| Weight 7 | 5044 |
| Weight 8 | 5369 |
| Weight 9 | 5284 |
| Weight 10 | 5403 |
| minEMBc | 4822 |

As discussed above, the methods and systems disclosed herein can also be used to calculate skew and chromatic dispersion in a multicore optical fiber. Similar to the above disclosed methods, the complex transfer function CTF(f) is derived first using the time-domain representation. More specifically, the CTF(f) is derived using equations (3), (4), and (5), as discussed above. At this point, as also discussed above, the CTF(f) is limited to frequency domain information and an inverse Fourier transform of the CTF(f) is calculated. However, when switching from the frequency domain to the time domain, equation (6) above must be satisfied in order to ensure that the time domain information does not have aliasing or ambiguity (due to the limited number of sampling points in the frequency domain information). As an example, for a multicore fiber with a length of 200 m and a group refractive index of about 1.45, the time of flight through the fiber (the time the signal enters the fiber to the time it exits the fiber) is about 967 ns. Therefore, over a frequency span of 10 MHz to 8 GHz, a number of sampling points (NOP) of about 15,473 is required to not incur any aliasing in the time domain information.

By continuing to follow the methods disclosed above, to obtain the time domain information from the frequency domain information, equations (8) and (9) are used. After obtaining the discrete inverse Fourier transform using equations (8) and (9), one can then obtain the time domain information, specifically with discrete data points that are separated from each by the time step dt. The time step dt is related to frequency span $\Delta f$ as discussed above in equation (10).

As also discussed above, the complex transfer function CTF(f) is "padded" with zeros at the high frequency end so that the frequency span $\Delta f$ of the complex transfer function CTF(f) increases. For example, the CTF(f) may be padded with zeros by increasing the frequency span by a factor of 10, or 100, or 1000 to increase the resolution of the time step dt.

Next, the complex transfer function CTF(f) is transformed by canceling the fast oscillating term due to the large absolute delay of the modes to obtain a transformed complex transfer function CTF'(f), as shown above in equation (13). Using equation (18) above, the output pulse $P_{out}(t)$ is determined from the transformed complex transfer function CTF'(f). The skew of the cores in the multicore fiber can then be determined from a plot of the output pulse $P_{out}(t)$. More specifically, the time of flight through each core is shown by the peak values of the output pulse $P_{out}(t)$ plot. The skew is then determined by calculating the difference of the peak values of the output pulse $P_{out}(t)$ plot.

However, when the data is under-sampled and equation (6) above is not met, the skew can still be determined by determining the difference of the peak values $\tau_n$ in the Fourier spectrum, as discussed above in equation (12). With a given length of the FUT 130, the integer k in equation (12) can be determined either through modeling or using the time of flight from a shorter piece of fiber.

Chromatic dispersion (CD) may be calculated over a wavelength range using equation (21):

$$CD = \frac{d\tau}{d\lambda} \quad (21)$$

where $\tau$ is the group delay and $d\tau/d\lambda$ is the first order derivative of the group delay over the wavelength $\lambda$. The above-disclosed methods to calculate the skew and chromatic dispersion can be used with a multicore fiber with two or more cores. In some embodiments, the multicore fiber has four or more cores, or six or more cores, or eight or more cores, or ten or more cores. Provided below is an example using the methods disclosed herein to determine the skew of a multicore optical fiber having four cores. A cross-section of the fiber 500 is provided in FIG. 9A.

A length of fiber 500 is 14326 m. Light with a wavelength of 1550 nm was launched into all four cores of fiber 500 to measure the skew of the fiber. By using the methods disclosed herein, the complex transfer function CTF(f) of fiber 500 was determined.

Figure 9B:
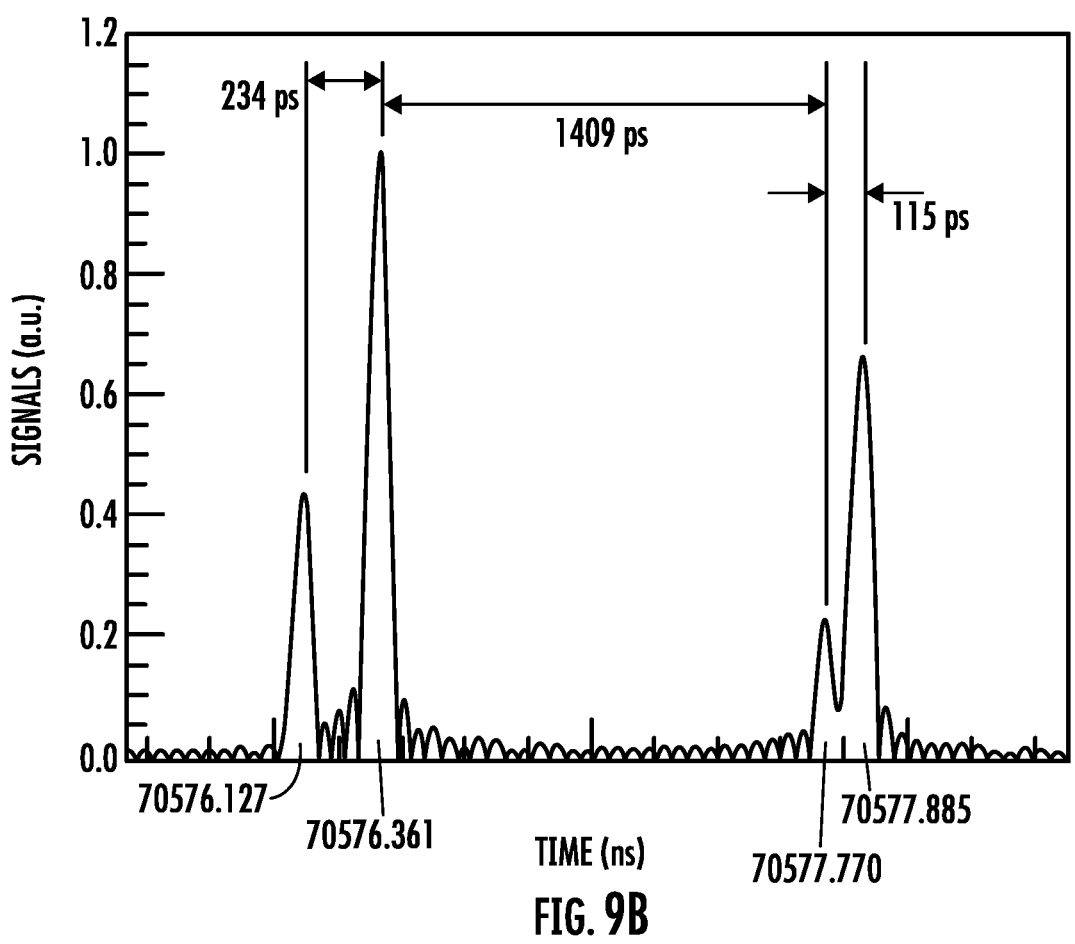
FIG. 9B shows a plot of output pulse vs. time for the optical fiber of FIG. 9A.

To recover the time domain information, the time position to of equation (12) was determined to be −94.2758 ns, the integer k of equation (12) was determined to be 353, the sign of equation (12) was "−", and the time step dt of equation (10) was determined to be 200.2002 ns, which resulted in a peak value $\tau_n$ of 70576.3949 ns. In this example, the peak value $\tau_n$ was used as $\tau_f$ in equation 13. Thus, the value $\tau_f$ was input into equation (13) to perform de-aliasing and to obtain the transformed complex transfer function CTF'(f). Using equation (18), the output pulse $P_{out}(t)$ was determined, a plot of which is shown in FIG. 9B. The time of flights of the four cores were determined to be 70576.127 ns, 70576.361 ns, 70577.770 ns and 70577.885 ns, which correspond to the peak values of the output pulse $P_{out}(t)$ plot. The skew values were then determined by calculating the difference in the time of flights (i.e., by calculating the difference in the peak values). As shown in FIG. 9B, the skew values for fiber 500 were determined to be: (i) 234 ps, (ii) 1409 ps, and (iii) 115 ps.

The methods and systems disclosed herein also include a second embodiment to calculate skew in a multicore optical fiber. With this second embodiment, the multicore optical fiber has two cores. Thus, the second embodiment provides a simplified version to measure skew of a multicore fiber with two cores.

With this second embodiment, the number of modes n of equation (5) above is 2 due to only having two cores. Equation (5) with two modes is shown below as equation (22):

$$CTF(f) = \sum_{j=1}^{n} a_j \cdot \exp(-i \cdot 2\pi f \tau_n) = a1 \cdot \exp(-i \cdot 2\pi f \tau_1) + a2 \cdot \exp(-i \cdot 2\pi f \tau_2) \quad (22)$$

The complex transfer function CTF(f) is in a linear scale. Therefore, the magnitude of the transfer function TF is calculated by determining the logarithmic or log scale of the magnitude of the complex transfer function CTF(f) (which is defined as |CTF(f)| in log scale). It is noted that the log scale is calculated to get the dB power level for the transfer function TF, which is obtained using equation (23) below.

$$TF = 20*\log 10\{\sqrt{1+c^2+2c\cdot\cos(2\pi(f)(\Delta T))}\}+d \quad (23)$$

wherein c is the relative power ratio equal to $a_2/a_1$, where $a_1$ is the amount of light excited into a first mode for a specific launch condition and $a_2$ is the amount of light excited into a second mode for a specific launch condition, f is the frequency (Hz), $\Delta\tau$ is the difference between the time of flight of a first mode ($\tau_1$) and the time of flight of a second mode ($\tau_2$) and is equal to $|\tau_2-\tau_1|$ (measured in ps), and d is equal to two times the optical loss of the measurement system (measured in dBe units), where the optical loss is the difference between the input power and output power of the measurement system.

Figure 10A:
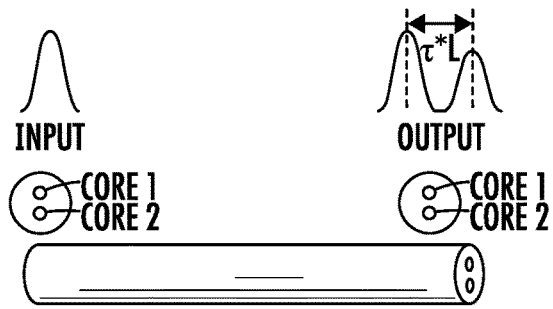
FIG. 10A illustrates example pulses propagating through a multicore optical fiber, according to embodiments of the present disclosure.
Figure 10B:
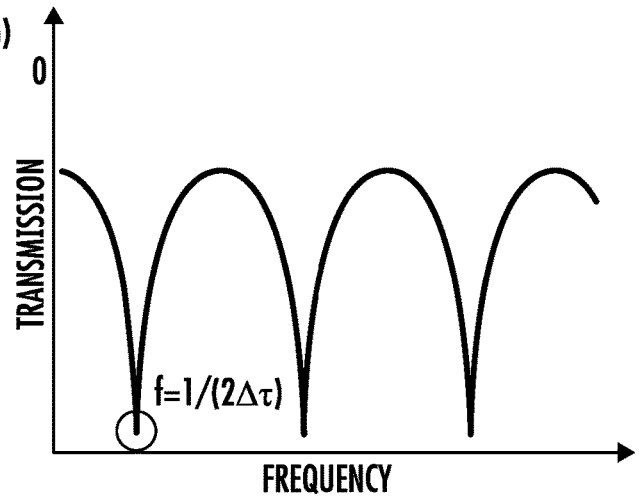
FIG. 10B shows a plot of the transfer function vs. frequency of the propagating pulses of FIG. 10A, according to embodiments of the present disclosure.

The transfer function TF of equation (23) is then plotted, as shown for example in FIGS. 10A and 10B. More specifically, FIG. 10A shows a plot of two pulses each propagating through a core of a multicore optical fiber and FIG. 10B shows the resulting plot of the transfer function TF. The time of flight difference between the two modes $\Delta\tau$ (which is equal to the skew in this embodiment since the multicore fiber only has two cores) is equal to the inverse of one-half of the frequency at the first oscillation period ($\Delta\tau=(\frac{1}{2})(f)$), which is the first dip in the plot of FIG. 10B. Thus, this second embodiment provides a simplified method to find the skew of a multicore fiber with no more than two cores.

Figure 11A:
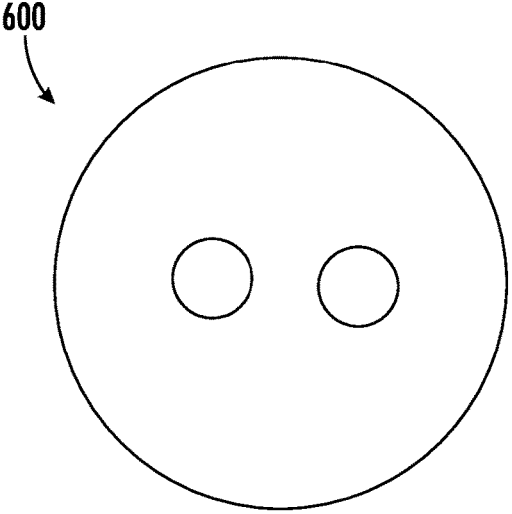
FIG. 11A shows a cross-section of an exemplary multi-core optical fiber, according to embodiments of the present disclosure.
Figure 11B:
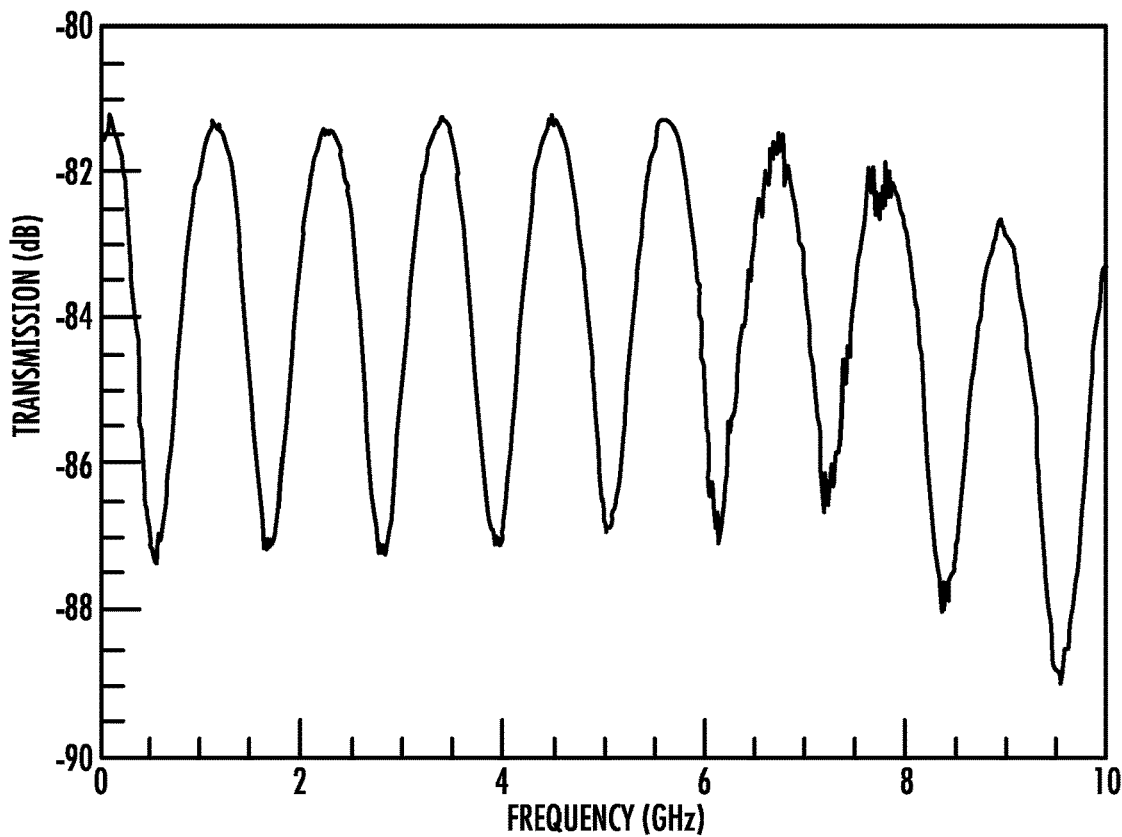
FIG. 11B shows a plot of the transfer function vs. frequency for the optical fiber of FIG. 11A, according to embodiments of the present disclosure.

Provided below is an example using the second skew method disclosed herein with an exemplary multicore optical fiber 600 having two cores and a length of 1100 m. A cross-section of fiber 600 is shown in FIG. 11A. Light with a wavelength of 1310 nm was launched into both cores of fiber 600 to measure the skew of the fiber. A plot of the transfer function TF of fiber 600 is shown in FIG. 11B. The frequency at the first oscillation period is located at 0.55945 GHz. The time of flight difference $\Delta\tau$ (skew) is equal to an inverse of one-half of the frequency at this first oscillation period, which is equal to 893 ps in this example (noting that 1/GHz is equal to 1000 ps).

Figure 11C:
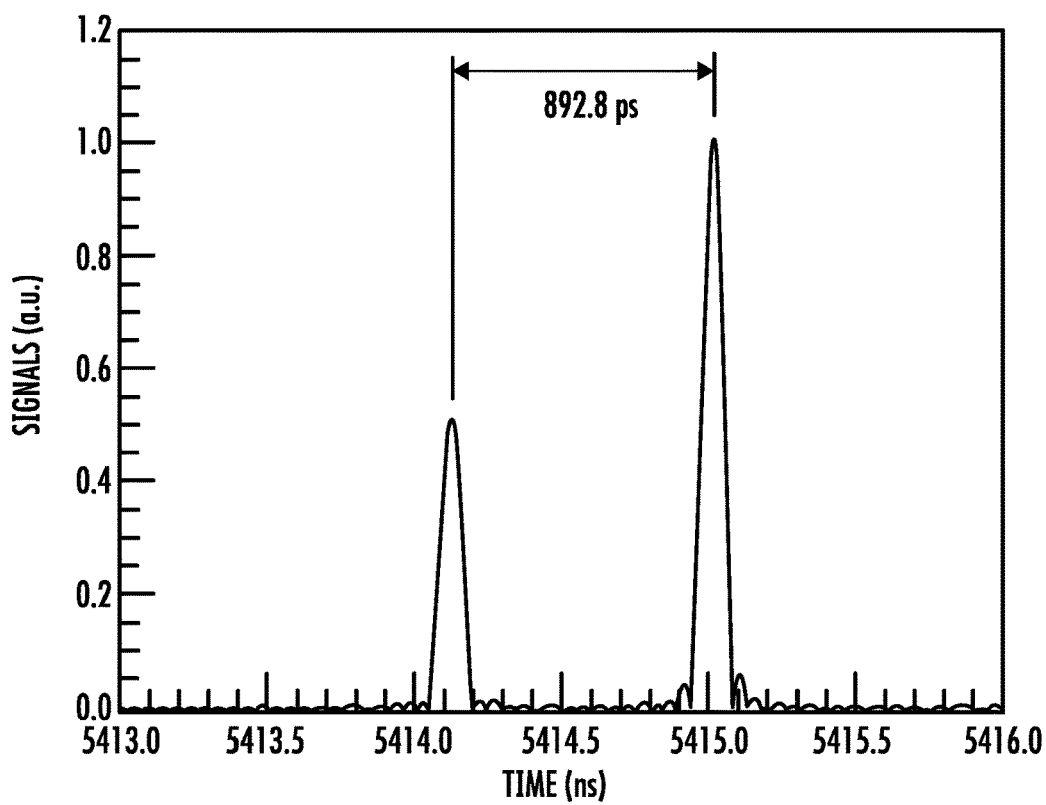
FIG. 11C shows a plot of output pulse vs. time for the optical fiber of FIG. 11A, according to embodiments of the present disclosure.

The skew of fiber 600 was also determined using the first skew embodiment disclosed above. Using the first embodiment, the time position $t_n$ of equation (12) was determined to be 9.616 ns, the integer k of equation (12) was determined to be 27, the sign of equation (12) was "+", and the time step dt of equation (10) was determined to be 200.2002 ns, which resulted in a peak value $\tau_n$ of 5415.0214 ns. In this example, the peak value $\tau_n$ was used as $\tau_f$ in equation 13. Thus, the value $\tau_f$ was input into equation (13) to perform de-aliasing and to obtain the transformed complex transfer function CTF'(f). Using equation (18), the output pulse $P_{out}(t)$ was determined, a plot of which is shown in FIG. 11C. The time of flights of the two cores was determined to be 5414.123 ns and 5415.019 ns, which correspond to the peak values of the output pulse $P_{out}(t)$. The skew value was then determined by calculating the difference in the time of flights (i.e., by calculating the difference in the peak values). As shown in FIG. 11C, the skew value for fiber 600 was determined to be 892.8 ps, which is very close to the skew value found using the second embodiment (as disclosed above).

In another embodiment, the chromatic dispersion was calculated for a multicore optical fiber with a 2×2 configuration using the embodiments disclosed herein. The cores of the multicore optical fiber were standard single-mode fiber cores with mode field diameter of 8.25 microns at a wavelength of 1310 nm and 10.02 microns at a wavelength of 1550 nm. The spacing between cores was about 41.16 microns. The fiber length was 3104 m sitting on a shipping spool. A light source was used to launch light with a wavelength of 1260 nm into the multicore optical fiber through an overfilled multimode fiber that was about 300 microns away from the multicore optical fiber so that the light beam could expand and reach all the four cores. An air gap was provided between the overfilled multimode fiber and the multicore optical fiber, and an air gap was provided between the multicore optical fiber and a receiver. No fan-in and fan-out devices were used to access each core, which significantly simplified the experimental setup and measurement procedure. The light from the overfilled multimode fiber had an optical power of −6.75 dBm, and the power reaching the receiver was −32.4 dBm. Despite the small amount of light coupled into the cores of the multicore optical fiber, the VNA 120 was still able to detect the light due to the high sensitivity of the VNA 120.

Figure 12A:
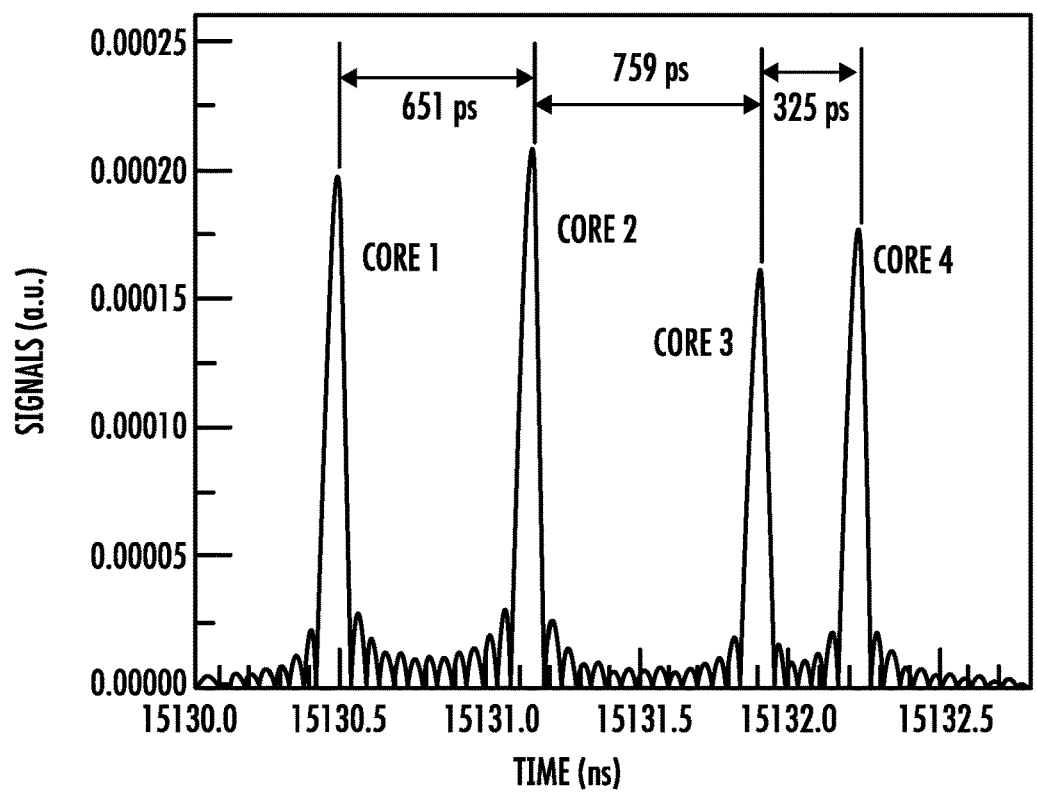
FIG. 12A shows a plot of output pulse vs. time of flight for an optical fiber, according to embodiments of the present disclosure.

FIG. 12A shows a plot of the output pulse output pulse $P_{out}(t)$ at 1310 nm calculated from a de-aliased time signal obtained from the inverse Fourier transform of the real part of the complex transfer function CTF(f) with proper de-aliasing (using equations (12), (13), and (18) above). When calculating the $P_{out}(t)$ of FIG. 12A, the sign in equation 12 was "−" so that the time sequence from the inverse Fourier transform was initially in a reverse order. With proper de-aliasing, the time sequence was rearranged. As shown in FIG. 12A, the peak values in the plot correspond to the time of flight for each core. Using the embodiments disclosed herein, the time of flight for each of the four cores was recovered over the whole O-band from 1260 nm to 1360 nm.

However, it is noted that the embodiments disclosed herein are not limited to the wavelength range of the O-band. For example, other wavelength ranges may be used including the C-band (1530 nm-1565 nm) or the L-band (1565 nm-1625 nm).

Figure 12B:
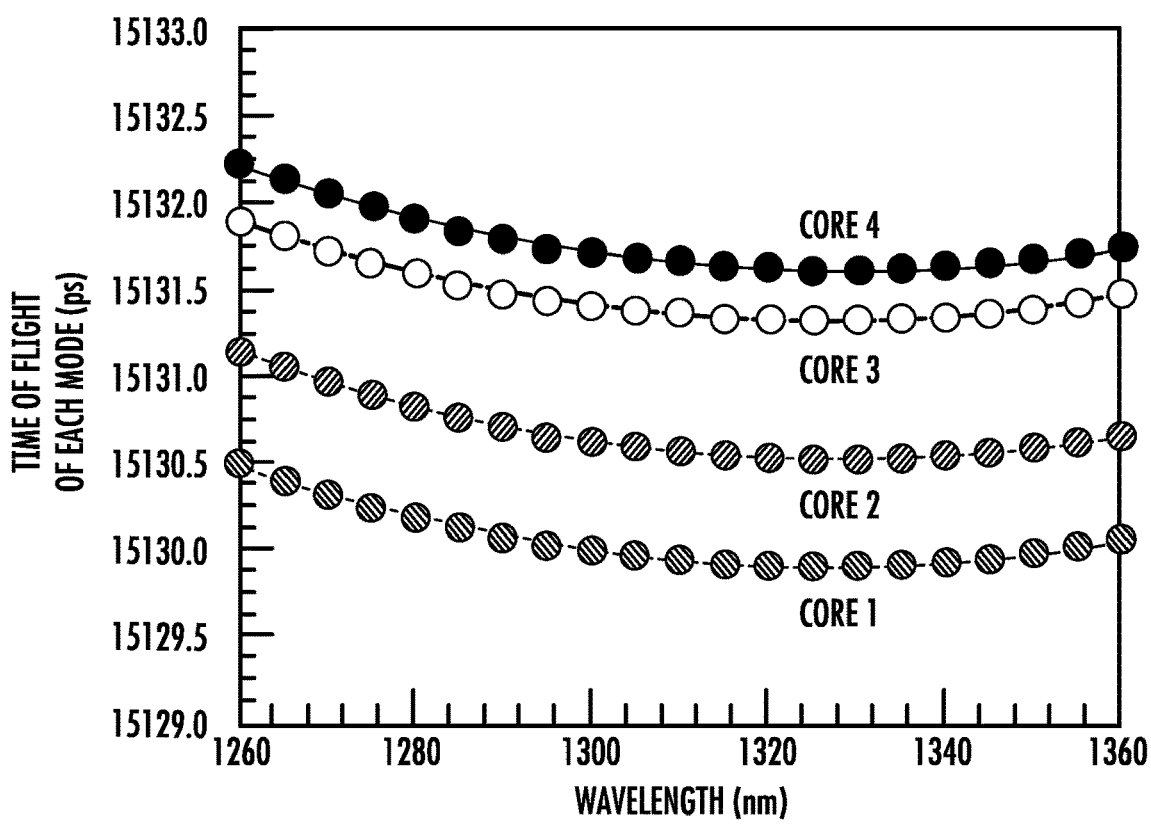
FIG. 12B shows a plot of time of flight vs. wavelength for the optical fiber of FIG. 12A, according to embodiments of the present disclosure.

FIG. 12B shows a plot of the time of flight of each core of the multicore optical fiber across the whole O-band. The skew values were determined by calculating the difference in the time of flights (i.e., by calculating the difference in the peak values of FIG. 12A). As shown in FIG. 12B, the skew is the largest between cores 1 and 4. Furthermore, the skews are mainly constant between the cores across the O-band.

Figure 12C:
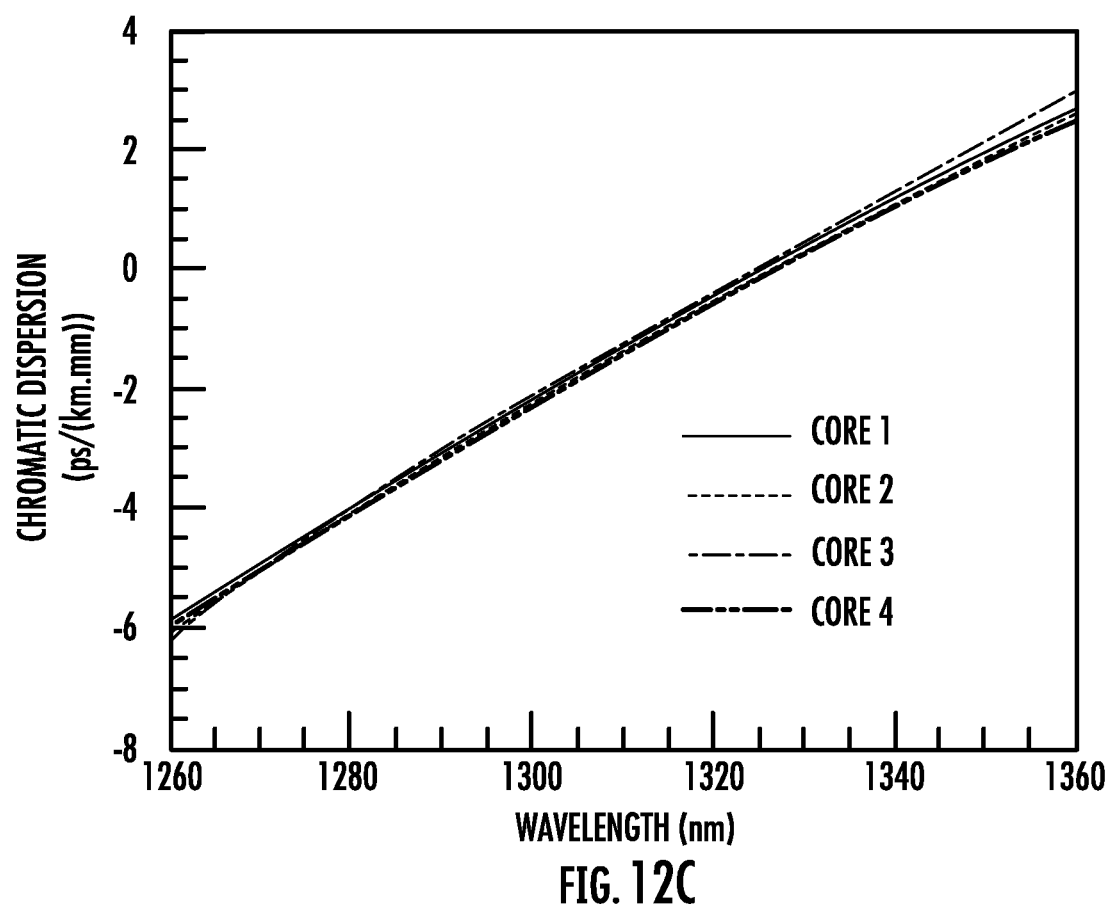
FIG. 12C shows a plot of chromatic dispersion v. wavelength for the optical fiber of FIG. 12A, according to embodiments of the present disclosure.

The chromatic dispersion of the multicore optical fiber was then determined using equation (21) above. More specifically, the time of flight $\tau$ in equation (21) (which is also referred to as the group delay) corresponds to the peak values of FIG. 12B and the wavelength range in equation (21) was over the O-band wavelength. However, as discussed above, other wavelength ranges may be used. The results are shown in FIG. 12C, which show that the chromatic dispersion slopes of the four cores is about 0.083 ps/(nm$^2$·km). Furthermore, the four cores were found to have zero dispersion wavelengths between 1324 nm to 1326 nm. These results were confirmed with measured results obtained from a commercial chromatic dispersion instrument (Perkin Elmer 500).

The chromatic dispersion measurements, according to the embodiments disclosed herein, were conducted on the four cores simultaneously using very low optical power. This provides a significant advantage over traditional methods and allows the measurements to be completed in a relatively simple and fast fashion.

Each of the servers and modules described above can be implemented in software, firmware, or hardware on a computing device. A computing device can include but is not limited to, a personal computer, a tablet, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions in a non-transitory manner. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Figure 13:
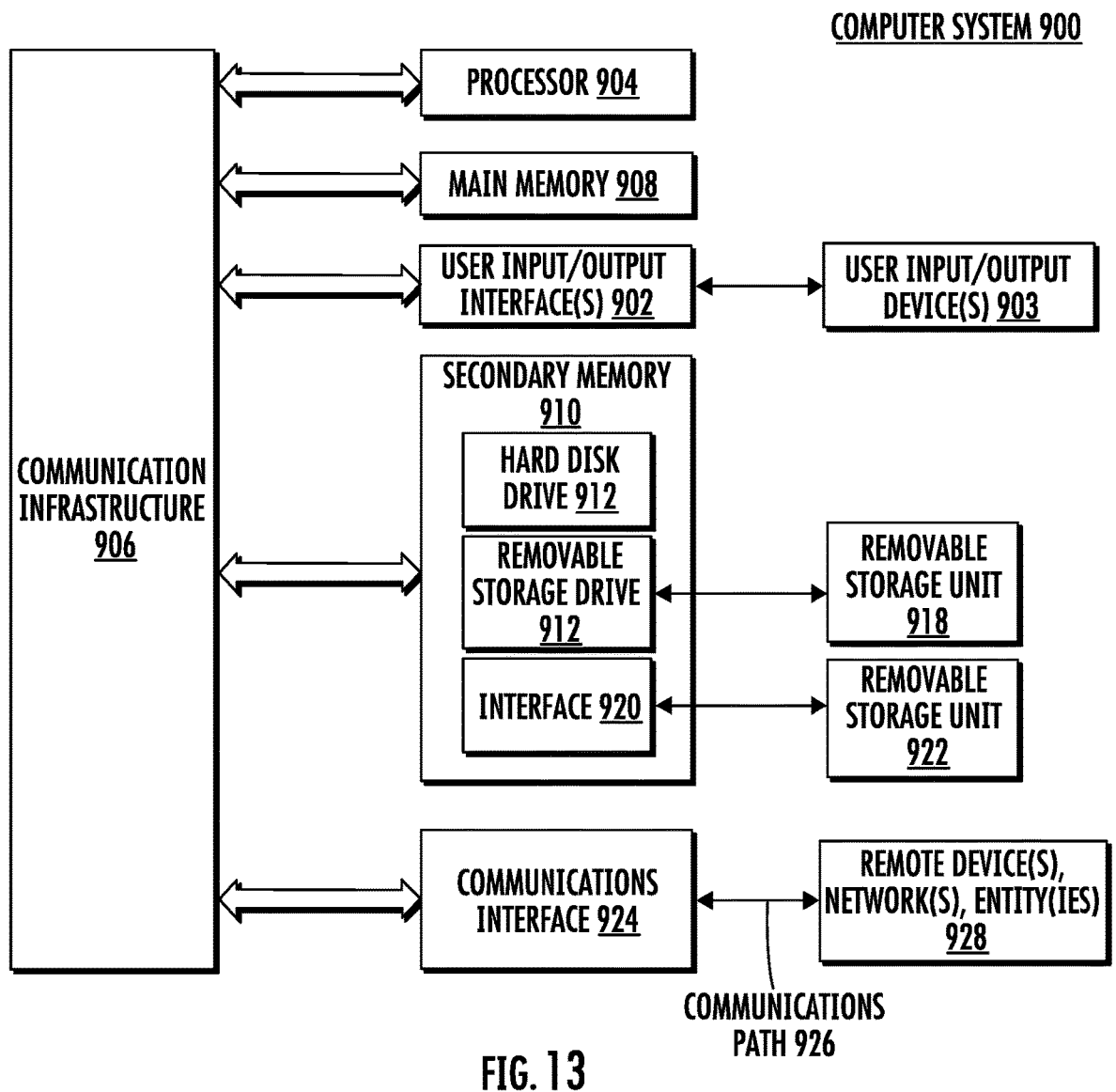
FIG. 13 illustrates an exemplary computer system, according to embodiments of the present disclosure.

Various embodiments may be implemented, for example, using one or more well-known computer systems, such as computer system 900 shown in FIG. 13. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system embodiments other than those described herein.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A method comprising:
    transmitting an intensity-modulated light through a mode conditioner to generate a mode-conditioned intensity-modulated light in one or a plurality of launch conditions;
    transmitting the mode-conditioned intensity-modulated light at an operating wavelength through a multimode optical fiber under test (FUT) to excite a plurality of modes of the FUT;
    converting with a photodetector the mode-conditioned intensity-modulated light transmitted through the FUT into an electrical signal;
    measuring with a vector network analyzer, based on the electrical signal, a complex transfer function CTF(f) of the FUT;
    obtaining an output pulse based on the measured complex transfer function CTF(f) from one or a plurality of launch conditions and an assumed input pulse using the following equation:

$$P_{out}(t) = \mathcal{F}^{-1}(CTF(f) * \mathcal{F}(P_{in}(t)))$$

wherein $P_{out}(t)$ is the output pulse, $\mathcal{F}^{-1}(CTF(f) * \mathcal{F}(P_{in}(t)))$ is the inverse Fourier transform of the function $CTF(f) * \mathcal{F}(P_{in}(t))$, and $\mathcal{F}(P_{in}(t))$ is the Fourier transform of the assumed input pulse; and calculating with the vector network analyzer a modal bandwidth of the FUT based on $P_{out}(t)$.

2. The method of claim 1, wherein the complex transfer function CTF(f) is measured such that the following equation is satisfied:

$$2 \cdot \max(\tau_i, \ldots \tau_n) \leq 1/df$$

wherein $\max(\tau_1, \ldots \tau_n)$ is the time of flight associated with each mode of the intensity-modulated light through the FUT and df is the frequency step.

3. The method of claim 2, wherein the frequency step df is related to a frequency span $\Delta f$ and number of sampling points (NOP) using the following equation:

$$df = \Delta f / (NOP - 1).$$

4. The method of claim 1, wherein the output pulse $P_{out}(t)$ is a linear combination of a plurality of output pulses from a set of launch conditions using the following equation $$P_{out}(t) = \Sigma_j a_j \cdot P_1(t)$$

where $P_j(t)$ is the measured j-th output pulse as a function of time as obtained from the j-th mode condition and $a_j$ is the weight used for the j-th output pulse.

5. The method claim 1, where the mode conditioner is a single mode fiber at the operating wavelength or equivalent optics using lenses.

6. The method of claim 5, wherein the single mode fiber is positioned at a set of controlled offsets relative to a center of the FUT and the step of measuring the CTF(f) is performed at the set of controlled offsets, and the method further comprises obtaining output pulses from the measured CTF(f).

7. The method of claim 6, further comprising assembling the output pulses into 10 pulses based upon 10 EMB weights and calculating the modal bandwidth from each of the 10 weights.

8. The method of claim 7, further comprising calculating the modal bandwidth of the FUT using the following equation:

$$TF_i = 10 \cdot \log10\left[\frac{\mathcal{F}(P_{out,i}(t))}{\mathcal{F}(P_{in}(t))}\right]$$

wherein $TF_i$ is the transfer function and $$\frac{\mathcal{F}(P_{out,i}(t))}{\mathcal{F}(P_{in}(t))}$$

is the ratio of the Fourier transform of the 10 assembled pulses over the Fourier transform of the assumed input pulse.

9. The method of claim 1, further comprising modifying the complex transfer function CTF(f) to obtain a transformed complex transfer function (CTF'(f)) using the following equation:

$$CTF'(f) = e^{i2\pi\tau_f} \cdot CTF(f)$$

wherein CTF'(f) is the transformed complex transfer function, e is the Euler's number, i is the imaginary unit, $\tau_f$ is a value in the Fourier spectrum, and f is frequency.

10. The method of claim 9, wherein the following condition is satisfied:

$$f_0 \cdot \frac{(NOP-1)}{\Delta f} = I$$

wherein $f_0$ is the minimum frequency in the measurement of the complex transfer function CTF(f), $\Delta f$ is the frequency span ($\Delta f = f_1 - f_0$) in the measurement of the complex transfer function CTF(f) such that $f_1$ is the maximum frequency, NOP is the number of sampling points, and I is an integer.

11. The method of claim 9, further comprising replacing the complex transfer function CTF(f) with the transformed complex transfer function CTF'(f) in the equation:

$$P_{out}(t) = \mathcal{F}^{-1}(CTF(f) * \mathcal{F}(P_{in}(t)))$$

to obtain the equation:

$$P_{out}(t) = \mathcal{F}^{-1}(CTF'(f) * \mathcal{F}(P_{in}(t))).$$

12. The method of claim 11, further comprising increasing a frequency span of the complex transfer function CTF(f) or the transformed complex transfer function CTF'(f) to obtain a time resolution dt of 10 ps or less.

13. The method of claim 9, wherein the complex transfer function CTF(f) is measured such that the following equation is satisfied:

$$2 \cdot \max(|\tau_1 - \tau_f| \ldots |\tau_n - \tau_f|) \leq 1/df$$

wherein $\tau_1, \ldots \tau_n$ is the time of flight associated with each mode of the intensity-modulated light through the FUT and df is the frequency step.

14. The method of claim 1, wherein the FUT comprises an optical fiber operating at a wavelength between 800 nm to 1650 nm.

15. The method of claim 1, wherein the FUT has a length of 5 km or greater.

16. A method comprising:
transmitting an intensity-modulated light through a mode conditioner to generate a mode-conditioned intensity-modulated light in one or a plurality of launch conditions;
transmitting the mode-conditioned intensity-modulated light at an operating wavelength through an optical fiber under test (FUT) to excite a plurality of modes of the FUT;
converting with a photodetector the mode-conditioned intensity-modulated light transmitted through the FUT into an electrical signal;
measuring with a vector network analyzer, based on the electrical signal, a complex transfer function CTF (f) of the FUT;
obtaining an output pulse based on the measured complex transfer function CTF (f) from one or a plurality of launch conditions and an assumed input pulse using the following equation:

$$P_{out}(t) = \mathcal{F}^{-1}(CTF(f) * \mathcal{F}(P_{in}(t)))$$

wherein $P_{out}(t)$ is the output pulse, $\mathcal{F}^{-1}(CTF(f) * \mathcal{F}(P_{in}(t)))$ is the inverse Fourier transform of the function $CTF(f) * \mathcal{F}(P_{in}(t))$, and $\mathcal{F}(P_{in}(t))$ is the Fourier transform of the assumed input pulse; and
calculating with the vector network analyzer a modal bandwidth of the FUT based on $P_{out}(t)$.

17. The method of claim 16, further comprising calculating skew of the FUT based on $P_{out}(t)$.

18. The method of claim 16, further comprising calculating chromatic dispersion of the FUT based on $P_{out}(t)$.

* * * * *

UNITED STATES PATENT AND TRADEMARK OFFICE
CERTIFICATE OF CORRECTION

PATENT NO. : 12,267,106 B2  
APPLICATION NO. : 17/725924  
DATED : April 1, 2025  
INVENTOR(S) : Xin Chen et al.

Page 1 of 1

It is certified that error appears in the above-identified patent and that said Letters Patent is hereby corrected as shown below:

In the Claims

In Claim 4, Column 26, Line 50, in the formula, delete "$P_1(t)$" and insert -- $P_j(t)$ --

Signed and Sealed this
Twentieth Day of January, 2026

John A. Squires
*Director of the United States Patent and Trademark Office*